United States Patent
Vallespi-Gonzalez et al.

(10) Patent No.: US 11,443,148 B2
(45) Date of Patent: **\*Sep. 13, 2022**

(54) MULTIPLE STAGE IMAGE BASED OBJECT DETECTION AND RECOGNITION

(71) Applicant: UATC, LLC, San Francisco, CA (US)

(72) Inventors: Carlos Vallespi-Gonzalez, Pittsburgh, PA (US); Joseph Lawrence Amato, Pittsburgh, PA (US); George Totolos, Jr., Cranberry Township, PA (US)

(73) Assignee: UATC, LLC, Mountain View, CA (US)

( \* ) Notice: Subject to any disclaimer, the term of this patent is extended or adjusted under 35 U.S.C. 154(b) by 0 days.

This patent is subject to a terminal disclaimer.

(21) Appl. No.: 17/007,969

(22) Filed: Aug. 31, 2020

(65) Prior Publication Data

US 2020/0394474 A1    Dec. 17, 2020

Related U.S. Application Data

(63) Continuation of application No. 15/972,566, filed on May 7, 2018, now Pat. No. 10,762,396.
(Continued)

(51) Int. Cl.
*G06K 9/00* (2022.01)
*G06K 9/62* (2022.01)
(Continued)

(52) U.S. Cl.
CPC ......... *G06K 9/6268* (2013.01); *G06K 9/6256* (2013.01); *G06K 9/6282* (2013.01);
(Continued)

(58) Field of Classification Search
CPC ......... G05D 1/0238; G05D 2201/0213; G06K 9/00201; G06K 9/00805; G06K 9/00825;
(Continued)

(56) References Cited

U.S. PATENT DOCUMENTS

| | | | | |
|---|---|---|---|---|
| 2015/0363660 A1\* | 12/2015 | Vidal | ................... | G06K 9/4642 |
| | | | | 382/173 |
| 2016/0379094 A1\* | 12/2016 | Mittal | .................. | G06K 9/2054 |
| | | | | 382/224 |

(Continued)

FOREIGN PATENT DOCUMENTS

JP    2017130155 A    7/2017

OTHER PUBLICATIONS

International Search Report and Written Opinion for Application No. PCT/US2018/063839, dated Mar. 20, 2019, 13 pages.

(Continued)

*Primary Examiner* — Xin Jia
(74) *Attorney, Agent, or Firm* — Dority & Manning, P.A.

(57) ABSTRACT

Systems, methods, tangible non-transitory computer-readable media, and devices for autonomous vehicle operation are provided. For example, a computing system can receive object data that includes portions of sensor data. The computing system can determine, in a first stage of a multiple stage classification using hardware components, one or more first stage characteristics of the portions of sensor data based on a first machine-learned model. In a second stage of the multiple stage classification, the computing system can determine second stage characteristics of the portions of sensor data based on a second machine-learned model. The computing system can generate an object output based on the first stage characteristics and the second stage characteristics. The object output can include indications associated with detection of objects in the portions of sensor data.

19 Claims, 8 Drawing Sheets

Related U.S. Application Data

(60) Provisional application No. 62/594,631, filed on Dec. 5, 2017.

(51) Int. Cl.
| | |
|---|---|
| *G06N 7/00* | (2006.01) |
| *G06T 7/521* | (2017.01) |
| *G06T 15/08* | (2011.01) |
| *G06N 20/00* | (2019.01) |
| *G06V 10/28* | (2022.01) |
| *G06V 10/50* | (2022.01) |
| *G06V 10/56* | (2022.01) |
| *G06V 20/58* | (2022.01) |
| *G06V 20/64* | (2022.01) |
| *G05D 1/02* | (2020.01) |

(52) U.S. Cl.
CPC ............. *G06N 7/005* (2013.01); *G06N 20/00* (2019.01); *G06T 7/521* (2017.01); *G06T 15/08* (2013.01); *G06V 10/28* (2022.01); *G06V 10/50* (2022.01); *G06V 10/56* (2022.01); *G06V 20/58* (2022.01); *G06V 20/584* (2022.01); *G06V 20/64* (2022.01); *G05D 1/0238* (2013.01); *G05D 2201/0213* (2013.01); *G06T 2207/20081* (2013.01); *G06T 2207/30261* (2013.01); *G06T 2210/12* (2013.01)

(58) Field of Classification Search
CPC ...... G06K 9/38; G06K 9/4642; G06K 9/4652; G06K 9/6256; G06K 9/6268; G06K 9/6282; G06N 20/00; G06N 7/005; G06T 15/08; G06T 2207/20081; G06T 2207/30261; G06T 2210/12; G06T 7/521
See application file for complete search history.

(56) References Cited

U.S. PATENT DOCUMENTS

| | | | |
|---|---|---|---|
| 2018/0018524 A1* | 1/2018 | Yao | G06K 9/00362 |
| 2018/0211403 A1* | 7/2018 | Hotson | G06T 7/60 |
| 2019/0164290 A1* | 5/2019 | Wang | G06F 16/55 |

OTHER PUBLICATIONS

Golovinskiy et al., "Shape-Based Recognition of 3D Point Clouds in Urban Environments", 2009 IEEE 12th Conference on Computer Vision, Piscataway, NJ, Sep. 29, 2009, 8 pages.

Ouyang et al., "Learning Chained Deep Features and Classifiers for Cascade in Object Detection", arxiv.org, Cornell University, Ithaca, NY, Feb. 27, 2017, 10 pages.

* cited by examiner

MULTIPLE STAGE IMAGE BASED OBJECT DETECTION AND RECOGNITION

PRIORITY CLAIM

The present application is a continuation of U.S. application Ser. No. 15/972,566 having a filing date of May 7, 2018, which claims the benefit of U.S. Provisional Application Ser. No. 62/594,631 filed Dec. 5, 2017. Applicant claims priority to and the benefit of each of such applications and incorporate all such applications herein by reference in its entirety.

FIELD

The present disclosure relates generally to operation of an autonomous vehicle including the detection and recognition of one or more characteristics of an object using multiple stage classification.

BACKGROUND

Vehicles, including autonomous vehicles, can receive data based on the state of the environment around the vehicle including the state of objects in the environment. This data can be used by the autonomous vehicle to perform various functions related to the movement of those objects through the environment. Further, as the vehicle travels through the environment the set of objects in the environment and the state of those objects can also change. As such, the safe operation of an autonomous vehicle in the environment relies on an accurate determination of the state of the environment. Accordingly, there exists a need for a computing system that more effectively determines the state of objects in an environment.

SUMMARY

Aspects and advantages of embodiments of the present disclosure will be set forth in part in the following description, or may be learned from the description, or may be learned through practice of the embodiments.

An example aspect of the present disclosure is directed to a computer-implemented method of autonomous vehicle operation. The computer-implemented method of autonomous vehicle operation can include receiving, by a computing system comprising one or more computing devices, object data including one or more portions of sensor data. The method can include determining, by the computing system, in a first stage of a multiple stage classification using one or more hardware components, one or more first stage characteristics of the one or more portions of sensor data based in part on a first machine-learned model. Further, the method can include determining, by the computing system, in a second stage of the multiple stage classification, one or more second stage characteristics of the one or more portions of sensor data based in part on a second machine-learned model. The method can include generating, by the computing system, an object output based in part on the one or more first stage characteristics and the one or more second stage characteristics. The object output can include one or more indications associated with detection of one or more objects in the one or more portions of sensor data.

Another example aspect of the present disclosure is directed to one or more tangible, non-transitory computer-readable media storing computer-readable instructions that when executed by one or more processors cause the one or more processors to perform operations. The operations can include receiving object data including one or more portions of sensor data. The operations can include determining, in a first stage of a multiple stage classification using one or more hardware components, one or more first stage characteristics of the one or more portions of sensor data based in part on a first machine-learned model. Further, the operations can include determining, in a second stage of the multiple stage classification, one or more second stage characteristics of the one or more portions of sensor data based in part on a second machine-learned model. The operations can include generating an object output based in part on the one or more first stage characteristics and the one or more second stage characteristics. The object output can include one or more indications associated with detection of one or more objects in the one or more portions of sensor data.

Another example aspect of the present disclosure is directed to an autonomous vehicle comprising one or more processors and one or more non-transitory computer-readable media storing instructions that when executed by the one or more processors cause the one or more processors to perform operations. The operations can include receiving object data including one or more portions of sensor data. The operations can include determining, in a first stage of a multiple stage classification using one or more hardware components, one or more first stage characteristics of the one or more portions of sensor data based in part on a first machine-learned model. Further, the operations can include determining, in a second stage of the multiple stage classification, one or more second stage characteristics of the one or more portions of sensor data based in part on a second machine-learned model. The operations can include generating an object output based in part on the one or more first stage characteristics and the one or more second stage characteristics. The object output can include one or more indications associated with detection of one or more objects in the one or more portions of sensor data.

Other example aspects of the present disclosure are directed to other systems, methods, vehicles, apparatuses, tangible non-transitory computer-readable media, and devices for autonomous vehicle operation including the detection and recognition of one or more characteristics of an object using multiple stage classification.

These and other features, aspects and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art are set forth in the specification, which makes reference to the appended figures, in which.

DETAILED DESCRIPTION

Figure 1:
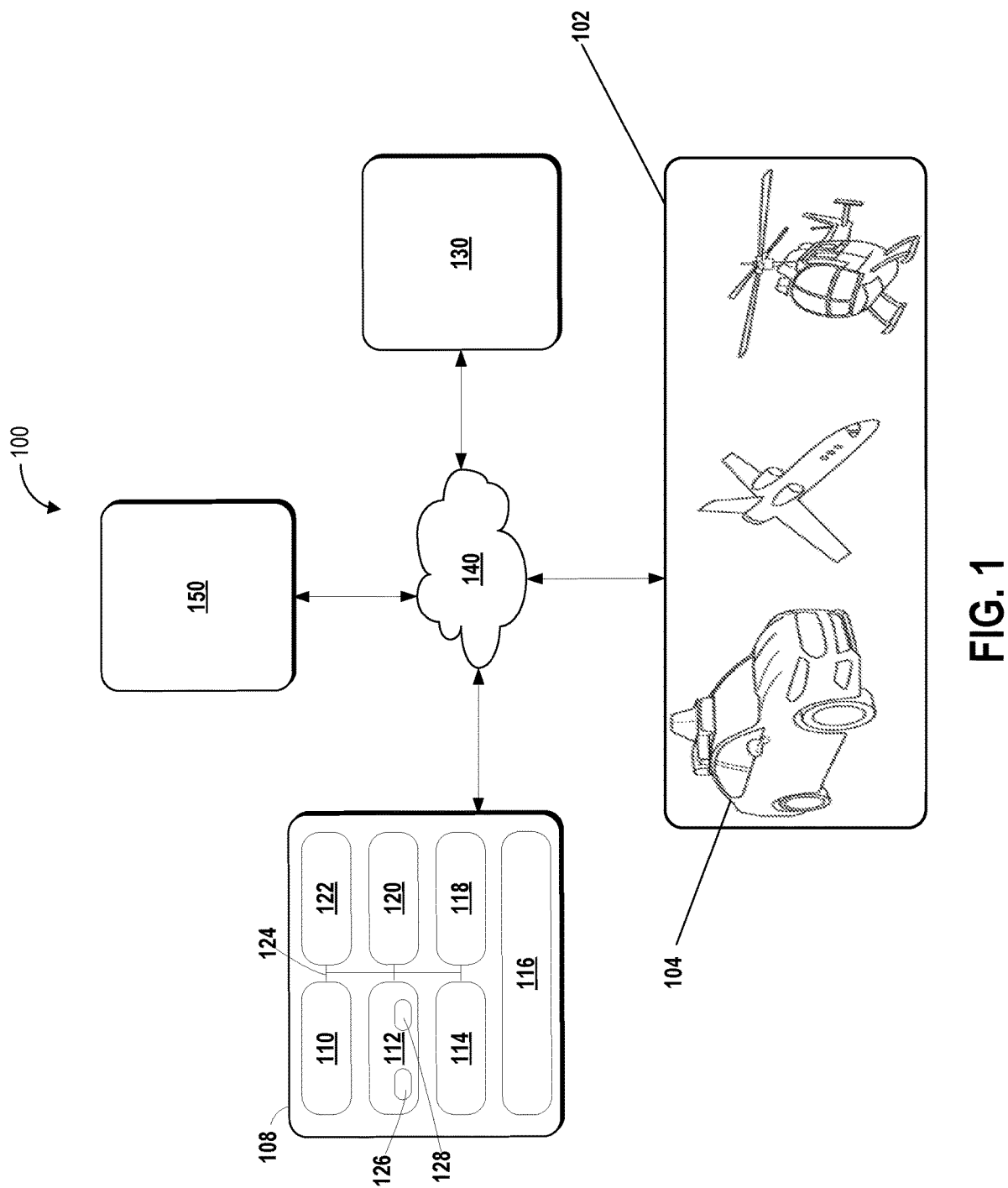
FIG. 1 depicts a diagram of an example system according to example embodiments of the present disclosure.

Example aspects of the present disclosure are directed to image classification or object detection (e.g., detecting, identifying, and/or recognizing objects represented in one or more images) using multiple stage classification that can be applied to vehicle technologies (e.g., autonomous vehicles, manually operated vehicles, and/or semi-autonomous vehicles). In particular, aspects of the present disclosure include receiving object data that is associated with one or more images (e.g., object data based on images captured by one or more cameras), determining, in a first stage of a multiple stage classification, one or more first stage characteristics of the object data using a first machine-learned model, determining, in a second stage of the multiple stage classification, one or more second stage characteristics of the object data using a second machine-learned model, and generating indications associated with detection of one or more objects in the one or more images.

By way of example, the disclosed technology can receive object data that is based in part on sensor data that can include images of an environment (e.g., an urban street with vehicles and pedestrians). The images can be based in part on output from one or more sensors including one or more light detection and ranging devices (LIDAR). The object data can be processed in a first stage of a multiple stage classification process that uses a first machine-learned model (e.g., a first decision tree model or a first neural network model) to determine one or more first stage characteristics including the portions of the one or more images that are background (e.g., the portions of the one or more images that are less likely to include objects of interest) and the portions of the one or more images that are foreground (e.g., the portions of the one or more images that are more likely to include objects of interest). For example, the first machine-learned model can be stored in, and implemented by, a hardware system including one or more programmable logic devices (e.g., a field programmable gate array (FPGA) device or an application specific integrated circuit (ASIC) device).

In the second stage of the multiple stage classification process, the disclosed technology can use a second machine-learned model (e.g., a second decision tree model or a second neural network model) to determine one or more second stage characteristics including the identity and location of objects (e.g., vehicles and/or pedestrians) with a greater level of confidence. In some implementations, the second machine-learned model can be stored in, and implemented by, a software system including one or more processing units, processor cores, microprocessors, and/or central processing units (CPUs)). The disclosed technology can then generate one or more indications that can be used in various ways, for example by an autonomous vehicle, to perform actions including detecting and/or tracking objects; activating vehicle systems based on the detection of the detected objects (e.g., vehicle notification systems); and/or modifying the path of the vehicle to avoid the detected objects (e.g., vehicle motion planning and/or autonomy systems).

As such, the disclosed technology can more effectively (e.g., more rapidly and accurately) detect and/or identify one or more objects in one or more portions of sensor data. In particular, the disclosed technology can achieve superior results by leveraging the capabilities of different types of hardware at different stages of the classification process, including using hardware that is specially configured in a first stage of the process and a more software driven approach using specially adapted software in a second stage of the process.

The disclosed technology can include an object detection system (e.g., a computing system including one or more computing devices with one or more processors and a memory) that can detect or identify one or more objects and/or a vehicle computing system that can control a variety of vehicle systems and communicate with the object detection system. The object detection system can process, generate, or exchange (e.g., send or receive) signals or data, including signals or data exchanged with various computing systems including the vehicle computing system, vehicle systems (e.g., vehicle engines, vehicle motors, vehicle electrical systems, and/or vehicle notification systems), and/or remote computing systems (e.g., computing devices at a remote location).

For example, the object detection system can exchange signals (e.g., electronic signals) or data with vehicle components or vehicle computing system including sensor systems (e.g., sensors that generate output based on the state of the physical environment in range of the sensors including LIDAR, cameras, microphones, radar, or sonar); communication systems (e.g., wired or wireless communication systems that can exchange signals or data with other devices); navigation systems (e.g., devices that can receive signals from GPS, GLONASS, or other systems used to determine a vehicle's geographical location); notification systems (e.g., devices used to provide notifications to pedestrians, cyclists, and vehicles, including electronic communication devices, display devices, status indicator lights, and/or audio output systems); braking systems (e.g., brakes of the vehicle including mechanical and/or electric brakes); propulsion systems (e.g., motors or engines including electric engines or internal combustion engines); and/or steering systems used to change the path, course, or direction of travel of the vehicle.

The object detection system can receive object data that is associated with one or more portions of sensor data (e.g., data output from one or more sensors including one or more LIDAR devices, one or more cameras, one or more RADAR devices, one or more sonar devices, and/or one or more thermal imaging devices). For example, the sensor data can include two-dimensional images including images captured by one or more cameras and/or three-dimensional point clouds captured by a LIDAR device. The one or more portions of sensor data can be analyzed to detect one or more objects including one or more pedestrians (e.g., one or more persons laying down, sitting, crouching, standing, walking, or running); one or more other vehicles (e.g., automobiles, trucks, buses, trolleys, motorcycles, mopeds, aircraft, boats, amphibious vehicles, and/or trains); one or more cyclists (e.g., a person sitting and/or riding on a bicycle); and/or one or more buildings (e.g., houses and/or apartment buildings). Further, the object data can include a set of three-dimensional points (e.g., x, y, and z coordinates) associated with one or more physical dimensions (e.g., the length, width, and/or height) of the one or more objects in the one or more images. The portions of sensor data and/or the associated object data can be used to determine physical properties or characteristics (e.g., visual properties or characteristics) of the one or more objects including the shape, texture, brightness, saturation, and/or physical dimensions (e.g., length, width, and/or height).

In some embodiments the one or more portions of sensor data, which can be associated with other data including the object data, can be based in part on sensor output from one or more sensors including one or more LIDAR devices, one or more cameras, one or more radar devices, one or more sonar devices, or one or more thermal imaging devices.

The object detection system can determine, in a first stage of a multiple stage classification, one or more first stage characteristics of the one or more portions of sensor data based in part on traversal of a first decision tree of a first machine-learned model (e.g., a first machine-learned model associated with data which can include the object data). In some embodiments, the first machine-learned model used by the object detection system can be based in part on one or more classification techniques including a random forest classifier, gradient boosting, a support vector machine, a logistic regression classifier, and/or a boosted forest classifier.

In some embodiments, the first stage of the multiple stage classification can include traversal of a first decision tree that includes a first plurality of nodes associated with a plurality of classifier labels. Each of the first plurality of nodes in the first decision tree can be associated with a classifier label that is used to classify, categorize and/or determine the one or more first stage characteristics of the one or more portions of sensor data. For example, the first stage of the multiple stage classification can include a determination of the one or more first stage characteristics including the portions of the one or more portions of sensor data that are background and the portions of the one or more portions of sensor data that are foreground. As such, the object detection system can provide a first stage output (i.e., the one or more first stage characteristics) that allows the second stage of the multiple stage classification to more efficiently process the one or more portions of sensor data by determining in advance the areas of the one or more portions of sensor data to focus on for purposes of object detection.

In some embodiments, the first stage of the multiple stage classification can be performed by one or more hardware components of the one or more computing devices including an FPGA, a digital signal processor (DSP), an application specific integrated circuit (ASIC), or a graphics processing unit (GPU). By way of example, using an FPGA can allow for an improvement in processing effectiveness through processing of the one or more images in parallel, which can result in image processing that exceeds the speed of other techniques that do not process the images in parallel (e.g., serial processing of the one or more images).

The object detection system can determine, in a second stage of the multiple stage classification, one or more second stage characteristics of the one or more objects based in part on traversal of a second decision tree of a second machine-learned model (e.g., a second machine-learned model associated with data which can include the object data). In some embodiments, the second machine-learned model can include, or be the same as, the first machine-learned model.

The second stage of the multiple stage classification can include traversal of a second decision tree that includes a second plurality of nodes associated with the second plurality of classifier labels. For example, each of the plurality of nodes in the second decision tree can be associated with a classifier label that is used to classify, categorize and/or determine the one or more first stage characteristics of the one or images. For example, the second stage of the multiple stage classification can include a determination of the one or more second stage characteristics of the one or more images including the location and identity of one or more objects (e.g., the location of pedestrians in the one or more images).

The second stage of the multiple stage classification can include determining one or more second stage characteristics of the one or more images that are based in part on the output of the first stage. The one or more second stage characteristics can include the one or more first stage characteristics (e.g., if a background characteristic is determined in the first stage a background characteristic can be further determined, to a greater level of confidence, in the second stage). Further, the one or more second stage characteristics can include characteristics that were not determined in the first stage. For example, if one or more objects (e.g., pedestrians, vehicles, and/or cyclists) were not determined in the first stage, the one or more objects can be determined in the second stage.

In some embodiments, the second decision tree can include an equal or greater number of nodes than the first plurality of nodes. For example, the first decision tree can include one-thousand nodes and the second decision tree can include five-thousand nodes which can allow for a deeper decision tree that can include more classifier labels and can be traversed for greater accuracy in detecting and/or identifying the one or more objects in the one or more images.

In some embodiments, parts of the second stage of the multiple stage classification can be performed by one or more software components of the one or more computing devices including one or more software components that operate or are executed on one or more central processing units. The use of software components can allow for more flexible adjustment and customization of the second machine-learned model.

The object detection system can determine, based in part on the object data and a machine-learned model that can be the first machine-learned model or the second machine-learned model, an amount (e.g., a number of occurrences) of false positive determinations of the one or more first stage characteristics (when the first machine-learned model is used) or the one or more second stage characteristics (when the second machine-learned model is used) of the one or more objects that has occurred. For example, a false positive determination of the one or more first stage characteristics can include a determination that a portion of the background (e.g., the Sun in the sky) is part of the foreground. Further, the object detection system can terminate traversal of a decision tree including the first decision tree or the second decision tree when the amount of false positive determinations exceeds a predetermined threshold level.

In some embodiments, the determination of the predetermined threshold level to terminate traversal of the decision tree can be based on performance (e.g., false positive rate) of the first machine-learned model or the second machine-learned model on a known data set (e.g., training data in which all of the objects have been correctly identified) at the various depths of the decision tree. For example, the predetermined threshold level to terminate traversal of the decision tree can be based in part on the depth of the first decision tree when the amount of false positives exceeds a predetermined percentage of identified objects (e.g., ten percent of the identified objects) or a predetermined number of objects per image (e.g., two objects per image).

The object detection system can include generating, based in part on the object data, visual descriptor output associated with the one or more images. When the one or more portions of sensor data include images, the visual descriptor output can include various properties or characteristics of the one or more images including color hue information, color saturation information, brightness information, or histogram of oriented gradients information. In some embodiments, the one or more first stage characteristics can be based in part on the visual descriptor output.

The object detection system can generate, based in part on the visual descriptor output, a heat map associated with the one or more images. The heat map can include a plurality of areas associated with a probability of at least one of the one or more objects being within the respective one of the plurality of areas. For example, the object detection system can segment the one or images in the plurality of areas and, for each of the plurality of areas, determine a probability of an object being within that area. In some embodiments, the one or more second stage characteristics can be based in part on the heat map.

The object detection system can determine, based in part on the visual descriptor output or the heat map, one or more portions of the one or more images that are associated with one or more background images (i.e., the portions of the one or more images that are background in contrast with a foreground of the one or more images that contains the one or more objects). In some embodiments, the second stage of the multiple stage classification can exclude the one or more portions of the one or more images that are associated with the one or more background images. In this way, the second stage of the multiple stage classification can focus more resources on a smaller portion of the object data (e.g., the foreground images of the one or more images) and conserve resources by not analyzing portions of the one or more images that are part of the background.

In some embodiments, at least one node of the second plurality of nodes in the second decision tree is a terminal node (e.g., the last node/leaf of the decision tree) of the first plurality of nodes in the first decision tree. For example, the first node in the second decision tree can be the terminal node in the first decision tree. In this way, the second decision tree can be a continuation of the first decision tree and leverage the benefits of building upon the first decision tree based in part on the outputs of the first decision tree.

In some embodiments, the second decision tree of the second machine-learned model can include an equal number of nodes as the first plurality of nodes or a greater number of nodes than the first plurality of nodes. In some embodiments, the first stage of the multiple stage classification can be performed on a customized device (e.g., an FPGA) that operates in parallel and can rapidly determine one or more first stage characteristics of the one or more portions of sensor data including whether a portion of sensor data (e.g., a portion of an image) is foreground or a background. After determining one or more first stage characteristics, the second stage of the multiple stage classification can use a decision tree that is deeper (i.e., has more nodes along the path from a root node to a terminal node) to determine one or more second stage characteristics that can, with a higher level of confidence, determine or identify one or more objects including vehicles, pedestrians, and/or cyclists.

The object detection system can generate an object output based in part on the one or more first stage characteristics and/or the one or more second stage characteristics. The object output can include one or more indications associated with detection of one or more objects in the one or more portions of sensor data. For example, the object output can be exchanged with vehicle systems or remote computing devices and can include one or more indications of whether objects were detected; the type of objects that were detected; the location of the objects detected; the physical characteristics of the objects detected; the velocity and/or acceleration of the objects detected; and/or a probability associated with an estimated accuracy of the object detection.

In some embodiments, the object output can be used by one or more vehicle systems to perform one or more actions including activating vehicle systems based on detection of the one or more objects (e.g., activating a headlight when an object is detected at night); modifying the path of the vehicle (e.g., to maneuver the vehicle around objects); and/or exchange the object output with one or more vehicle systems or remote computing systems.

The object detection system can determine, based in part on the object output, locations for one or more bounding shapes (e.g., two-dimensional or three-dimensional bounding boxes and/or bounding polygons) associated with the one or more objects in the one or more portions of sensor data. The object detection system can use the first machine-learned model and/or the second machine-learned model to determine the one or more locations or areas of the sensor data that are more likely to contain an object or a certain type of object (e.g., a pedestrian is more likely to be in the ground portion of an image than the sky portion of an image).

The object detection system can select a set of the locations for the one or more bounding shapes. An image processing technique (e.g., a filter including non-maximum suppression) can then be used to select a location including an optimal location from the set of locations for the one or more bounding shapes. For example, by analyzing the image gradient direction, pixels that are not part of the local maxima for the portion of the sensor data corresponding to each of the set of locations can be suppressed. The object detection system can, based on the set of locations for the one or more bounding shapes, generate the one or more bounding shapes in the selected locations.

The systems, methods, devices, and tangible, non-transitory computer-readable media in the disclosed technology can provide a variety of technical effects and benefits to the overall operation of autonomous vehicles including vehicle computing systems that use machine-learned models for the detection of objects. In particular, the disclosed technology leverages the advantages of a multi-stage classifier to reduce the time to create an output while maintaining a high level of accuracy with respect to object detection and identification. For example, a first stage of classification that uses hardware components that can process inputs (e.g., object data based on sensor outputs from one or more sensors including LIDAR and/or cameras) in parallel and can rapidly identify portions of images for further processing in subsequent stages. Then, in a second stage of classification, the disclosed technology can more thoroughly process the one or more images using a deeper decision tree. As a result, the disclosed technology can output highly accurate results in less time. Additionally, the use of hardware components including an FPGA can result in lower latency and greater energy efficiency in comparison to general usage processors.

Furthermore, the disclosed technology can apply early termination of traversing the decision tree at any of the multiple stages of the classification process. Early termination allows the disclosed technology to conserve computing resources by not continuing to traverse a decision tree when the estimated probability that the output of a decision tree (e.g., detection of an object) is correct has reached a predetermined threshold level. For example, if after traversing five hundred nodes along a thousand node long path of a decision tree, the probability of correct object detection is ninety-nine point nine (99.9) percent, computational resources could be conserved by terminating early and not traversing the remaining five hundred nodes of the decision tree.

The disclosed technology can more effectively determine one or more characteristics of one or more images including shapes, physical dimensions, colors, and/or textures of objects through use of one or more machine-learned models that allows such object characteristics to be determined more rapidly and with greater precision, speed, and accuracy.

As a result of more effective determinations of one or more characteristics of sensor data (e.g., background characteristics, foreground characteristics, object shapes, and/or object physical dimensions) the disclosed technology can enable improvements in safety through earlier and more accurate object detection. Further, when paired with vehicle systems including steering, propulsion, braking, or notification systems the disclosed technology can respectively change course, increase velocity, reduce velocity, or provide notifications to other vehicles, pedestrians, and/or cyclists.

Accordingly, the disclosed technology provides more effective detection or identification of objects in one or more images by leveraging the operational benefits of a multiple stage classifier. In this way, various technologies including autonomous vehicles can benefit from the improved object detection.

With reference now to FIGS. 1-9, example embodiments of the present disclosure will be discussed in further detail. FIG. 1 depicts a diagram of an example system according to example embodiments of the present disclosure. As illustrated, a system 100 can include a plurality of vehicles 102; a vehicle 104; a vehicle computing system 108 that includes one or more computing devices 110; one or more data acquisition systems 112; an autonomy system 114; one or more control systems 116; one or more human machine interface systems 118; other vehicle systems 120; a communications system 122; a network 124; one or more image capture devices 126; one or more sensors 128; one or more remote computing devices 130; a communications network 140; and an operations computing system 150.

The operations computing system 150 can be associated with a service provider that provides one or more vehicle services to a plurality of users via a fleet of vehicles that includes, for example, the vehicle 104. The vehicle services can include transportation services (e.g., rideshare services), courier services, delivery services, and/or other types of services.

The operations computing system 150 can include multiple components for performing various operations and functions. For example, the operations computing system 150 can include and/or otherwise be associated with one or more remote computing devices that are remote from the vehicle 104. The one or more remote computing devices can include one or more processors and one or more memory devices. The one or more memory devices can store instructions that when executed by the one or more processors cause the one or more processors to perform operations and functions associated with operation of the vehicle including: receiving object data including portions of sensor data; determining, in a first stage of a multiple stage classification, first stage characteristics of the portions of sensor data based in part on a first machine-learned model; determining, in a second stage of the multiple stage classification, second stage characteristics of the portions of sensor data based in part on a second machine-learned model; and generating, an object output based in part on the first stage characteristics and the second stage characteristics, the object output including indications associated with detection of objects in the portions of sensor data.

For example, the operations computing system 150 can be configured to monitor and communicate with the vehicle 104 and/or its users to coordinate a vehicle service provided by the vehicle 104. To do so, the operations computing system 150 can manage a database that includes data including vehicle status data associated with the status of vehicles including the vehicle 104. The vehicle status data can include a location of the plurality of vehicles 102 (e.g., a latitude and longitude of a vehicle), the availability of a vehicle (e.g., whether a vehicle is available to pick-up or drop-off passengers or cargo), or the state of objects external to the vehicle (e.g., the physical dimensions, velocity, acceleration, and/or orientation of objects external to the vehicle).

An indication, record, and/or other data indicative of the state of the one or more objects, including the state (e.g., physical dimensions, velocity, acceleration, color, location, and/or orientation) of the one or more objects, can be stored locally in one or more memory devices of the vehicle 104. Furthermore, the vehicle 104 can provide data indicative of the state of the one or more objects (e.g., objects external to the vehicle) within a predefined distance of the vehicle 104 to the operations computing system 150, which can store an indication, record, and/or other data indicative of the state of the one or more objects within a predefined distance of the vehicle 104 in one or more memory devices associated with the operations computing system 150.

The operations computing system 150 can communicate with the vehicle 104 via one or more communications networks including the communications network 140. The communications network 140 can exchange (send or receive) signals (e.g., electronic signals) or data (e.g., data from a computing device) and include any combination of various wired (e.g., twisted pair cable) and/or wireless communication mechanisms (e.g., cellular, wireless, satellite, microwave, and radio frequency) and/or any desired network topology (or topologies). For example, the communications network 140 can include a local area network (e.g. intranet), wide area network (e.g. Internet), wireless LAN network (e.g., via Wi-Fi), cellular network, a SATCOM network, VHF network, a HF network, a WiMAX based network, and/or any other suitable communications network (or combination thereof) for transmitting data to and/or from the vehicle 104.

The vehicle 104 can be a ground-based vehicle (e.g., an automobile, and/or a truck), an aircraft, a watercraft, and/or another type of vehicle. The vehicle 104 can be an autonomous vehicle that can perform various actions including driving, navigating, and/or operating, with minimal and/or no interaction from a human driver. The autonomous vehicle 104 can be configured to operate in one or more modes including, for example, a fully autonomous operational mode, a semi-autonomous operational mode, a park mode, and/or a sleep mode. A fully autonomous (e.g., self-driving) operational mode can be one in which the vehicle 104 can provide driving and navigational operation with minimal and/or no interaction from a human driver present in the vehicle. A semi-autonomous operational mode can be one in which the vehicle 104 can operate with some interaction from a human driver present in the vehicle. Park and/or sleep modes can be used between operational modes while the vehicle 104 performs various actions including waiting to provide a subsequent vehicle service, and/or recharging between operational modes.

The vehicle 104 can include or be associated with a vehicle computing system 108. The vehicle computing system 108 can include various components for performing various operations and functions. For example, the vehicle computing system 108 can include one or more computing devices 110 on-board the vehicle 104. The one or more computing devices 110 can include one or more processors and one or more memory devices, each of which are on-board the vehicle 104. The one or more memory devices can store instructions that when executed by the one or more processors cause the one or more processors to perform operations and functions, including taking the vehicle 104 out-of-service, stopping the motion of the vehicle 104, determining the state of one or more objects within a predefined distance of the vehicle 104, or generating indications associated with the state of one or more objects within a predefined distance of the vehicle 104, as described herein. Further, the vehicle computing system 108 can perform one or more operations including: receiving object data including portions of sensor data; determining, in a first stage of a multiple stage classification, first stage characteristics of the portions of sensor data based in part on a first machine-learned model; determining, in a second stage of the multiple stage classification, second stage characteristics of the portions of sensor data based in part on a second machine-learned model; and generating, an object output based in part on the first stage characteristics and the second stage characteristics, the object output including indications associated with detection of objects in the portions of sensor data.

The one or more computing devices 110 can implement, include, and/or otherwise be associated with various other systems on-board the vehicle 104. The one or more computing devices 110 can be configured to communicate with these other on-board systems of the vehicle 104. For instance, the one or more computing devices 110 can be configured to communicate with one or more data acquisition systems 112, an autonomy system 114 (e.g., including a navigation system), one or more control systems 116, one or more human machine interface systems 118, other vehicle systems 120, and/or a communications system 122. The one or more computing devices 110 can be configured to communicate with these systems via a network 124. The network 124 can include one or more data buses (e.g., controller area network (CAN)), on-board diagnostics connector (e.g., OBD-II), and/or a combination of wired and/or wireless communication links. The one or more computing devices 110 and/or the other on-board systems can send and/or receive data, messages, and/or signals, amongst one another via the network 124.

The one or more data acquisition systems 112 can include various devices configured to acquire data associated with the vehicle 104. This can include data associated with the vehicle including one or more of the vehicle's systems (e.g., health data), the vehicle's interior, the vehicle's exterior, the vehicle's surroundings, and/or the vehicle users. The one or more data acquisition systems 112 can include, for example, one or more image capture devices 126. The one or more image capture devices 126 can include one or more cameras, LIDAR systems), two-dimensional image capture devices, three-dimensional image capture devices, static image capture devices, dynamic (e.g., rotating) image capture devices, video capture devices (e.g., video recorders), lane detectors, scanners, optical readers, electric eyes, and/or other suitable types of image capture devices. The one or more image capture devices 126 can be located in the interior and/or on the exterior of the vehicle 104. The one or more image capture devices 126 can be configured to acquire image data to be used for operation of the vehicle 104 in an autonomous mode. For example, the one or more image capture devices 126 can acquire image data to allow the vehicle 104 to implement one or more machine vision techniques (e.g., to detect objects in the surrounding environment).

Additionally, or alternatively, the one or more data acquisition systems 112 can include one or more sensors 128. The one or more sensors 128 can include impact sensors, motion sensors, pressure sensors, mass sensors, weight sensors, volume sensors (e.g., sensors that can determine the volume of an object in liters), temperature sensors, humidity sensors, RADAR, sonar, radios, medium-range and long-range sensors (e.g., for obtaining information associated with the vehicle's surroundings), global positioning system (GPS) equipment, proximity sensors, and/or any other types of sensors for obtaining data indicative of parameters associated with the vehicle 104 and/or relevant to the operation of the vehicle 104. The one or more data acquisition systems 112 can include the one or more sensors 128 dedicated to obtaining data associated with a particular aspect of the vehicle 104, including, the vehicle's fuel tank, engine, oil compartment, and/or wipers. The one or more sensors 128 can also, or alternatively, include sensors associated with one or more mechanical and/or electrical components of the vehicle 104. For example, the one or more sensors 128 can be configured to detect whether a vehicle door, trunk, and/or gas cap, is in an open or closed position. In some implementations, the data acquired by the one or more sensors 128 can help detect other vehicles and/or objects, road conditions (e.g., curves, potholes, dips, bumps, and/or changes in grade), measure a distance between the vehicle 104 and other vehicles and/or objects.

The vehicle computing system 108 can also be configured to obtain map data. For instance, a computing device of the vehicle (e.g., within the autonomy system 114) can be configured to receive map data from one or more remote computing device including the operations computing system 150 or the one or more remote computing devices 130 (e.g., associated with a geographic mapping service provider). The map data can include any combination of two-dimensional or three-dimensional geographic map data associated with the area in which the vehicle can travel including areas the vehicle is currently travelling, has previously travelled, or will travel to in the future.

The data acquired from the one or more data acquisition systems 112, the map data, and/or other data can be stored in one or more memory devices on-board the vehicle 104. The on-board memory devices can have limited storage capacity. As such, the data stored in the one or more memory devices may need to be periodically removed, deleted, and/or downloaded to another memory device (e.g., a database of the service provider). The one or more computing devices 110 can be configured to monitor the memory devices, and/or otherwise communicate with an associated processor, to determine how much available data storage is in the one or more memory devices. Further, one or more of the other on-board systems (e.g., the autonomy system 114) can be configured to access the data stored in the one or more memory devices.

The autonomy system 114 can be configured to allow the vehicle 104 to operate in an autonomous mode. For instance, the autonomy system 114 can obtain the data associated with the vehicle 104 (e.g., acquired by the one or more data acquisition systems 112). The autonomy system 114 can also obtain the map data. The autonomy system 114 can control various functions of the vehicle 104 based, at least in part, on the acquired data associated with the vehicle 104 and/or the map data to implement the autonomous mode. For example, the autonomy system 114 can include various models to perceive road features, signage, and/or objects, people, animals, based on the data acquired by the one or more data acquisition systems 112, map data, and/or other data. In some implementations, the autonomy system 114 can include machine-learned models that use the data acquired by the one or more data acquisition systems 112, the map data, and/or other data to help operate the autonomous vehicle. Moreover, the acquired data can help detect other vehicles and/or objects, road conditions (e.g., curves, potholes, dips, bumps, changes in grade, or the like), measure a distance between the vehicle 104 and other vehicles and/or objects. The autonomy system 114 can be configured to predict the position and/or movement (or lack thereof) of such elements (e.g., using one or more odometry techniques). The autonomy system 114 can be configured to plan the motion of the vehicle 104 based, at least in part, on such predictions. The autonomy system 114 can implement the planned motion to appropriately navigate the vehicle 104 with minimal or no human intervention. For instance, the autonomy system 114 can include a navigation system configured to direct the vehicle 104 to a destination location. The autonomy system 114 can regulate vehicle speed, acceleration, deceleration, steering, and/or operation of other components to operate in an autonomous mode to travel to such a destination location.

The autonomy system 114 can determine a position and/or route for the vehicle 104 in real-time and/or near real-time. For instance, using acquired data, the autonomy system 114 can calculate one or more different potential routes (e.g., every fraction of a second). The autonomy system 114 can then select which route to take and cause the vehicle 104 to navigate accordingly. By way of example, the autonomy system 114 can calculate one or more different straight paths (e.g., including some in different parts of a current lane), one or more lane-change paths, one or more turning paths, and/or one or more stopping paths. The vehicle 104 can select a path based, at last in part, on acquired data, current traffic factors, travelling conditions associated with the vehicle 104. In some implementations, different weights can be applied to different criteria when selecting a path. Once selected, the autonomy system 114 can cause the vehicle 104 to travel according to the selected path.

The one or more control systems 116 of the vehicle 104 can be configured to control one or more aspects of the vehicle 104. For example, the one or more control systems 116 can control one or more access points of the vehicle 104. The one or more access points can include features including the vehicle's door locks, trunk lock, hood lock, fuel tank access, latches, and/or other mechanical access features that can be adjusted between one or more states, positions, and/or locations. For example, the one or more control systems 116 can be configured to control an access point (e.g., door lock) to adjust the access point between a first state (e.g., lock position) and a second state (e.g., unlocked position). Additionally, or alternatively, the one or more control systems 116 can be configured to control one or more other electrical features of the vehicle 104 that can be adjusted between one or more states. For example, the one or more control systems 116 can be configured to control one or more electrical features (e.g., hazard lights, microphone) to adjust the feature between a first state (e.g., off) and a second state (e.g., on).

The one or more human machine interface systems 118 can be configured to allow interaction between a user (e.g., human), the vehicle 104 (e.g., the vehicle computing system 108), and/or a third party (e.g., an operator associated with the service provider). The one or more human machine interface systems 118 can include a variety of interfaces for the user to input and/or receive information from the vehicle computing system 108. For example, the one or more human machine interface systems 118 can include a graphical user interface, direct manipulation interface, web-based user interface, touch user interface, attentive user interface, conversational and/or voice interfaces (e.g., via text messages, chatter robot), conversational interface agent, interactive voice response (IVR) system, gesture interface, and/or other types of interfaces. The one or more human machine interface systems 118 can include one or more input devices (e.g., touchscreens, keypad, touchpad, knobs, buttons, sliders, switches, mouse, gyroscope, microphone, other hardware interfaces) configured to receive user input. The one or more human machine interfaces 118 can also include one or more output devices (e.g., display devices, speakers, lights) to receive and output data associated with the interfaces.

The other vehicle systems 120 can be configured to control and/or monitor other aspects of the vehicle 104. For instance, the other vehicle systems 120 can include software update monitors, an engine control unit, transmission control unit, and/or on-board memory devices. The one or more computing devices 110 can be configured to communicate with the other vehicle systems 120 to receive data and/or to send to one or more signals. By way of example, the software update monitors can provide, to the one or more computing devices 110, data indicative of a current status of the software running on one or more of the on-board systems and/or whether the respective system requires a software update.

The communications system 122 can be configured to allow the vehicle computing system 108 (and its one or more computing devices 110) to communicate with other computing devices. In some implementations, the vehicle computing system 108 can use the communications system 122 to communicate with one or more user devices over the networks. In some implementations, the communications system 122 can allow the one or more computing devices 110 to communicate with one or more of the systems on-board the vehicle 104. The vehicle computing system 108 can use the communications system 122 to communicate with the operations computing system 150 and/or the one or more remote computing devices 130 over the networks (e.g., via one or more wireless signal connections). The communications system 122 can include any suitable components for interfacing with one or more networks, including for example, transmitters, receivers, ports, controllers, antennas, or other suitable components that can help facilitate communication with one or more remote computing devices that are remote from the vehicle 104.

In some implementations, the one or more computing devices 110 on-board the vehicle 104 can obtain vehicle data indicative of one or more parameters associated with the vehicle 104. The one or more parameters can include information, including health and maintenance information, associated with the vehicle 104, the vehicle computing system 108, and/or one or more of the on-board systems. For example, the one or more parameters can include fuel level, engine conditions, tire pressure, conditions associated with the vehicle's interior, conditions associated with the vehicle's exterior, mileage, time until next maintenance, time since last maintenance, available data storage in the on-board memory devices, a charge level of an energy storage device in the vehicle 104, current software status, needed software updates, and/or other heath and maintenance data of the vehicle 104.

At least a portion of the vehicle data indicative of the parameters can be provided via one or more of the systems on-board the vehicle 104. The one or more computing devices 110 can be configured to request the vehicle data from the on-board systems on a scheduled and/or as-needed basis. In some implementations, one or more of the on-board systems can be configured to provide vehicle data indicative of one or more parameters to the one or more computing devices 110 (e.g., periodically, continuously, as-needed, as requested). By way of example, the one or more data acquisitions systems 112 can provide a parameter indicative of the vehicle's fuel level and/or the charge level in a vehicle energy storage device. In some implementations, one or more of the parameters can be indicative of user input. For example, the one or more human machine interfaces 118 can receive user input (e.g., via a user interface displayed on a display device in the vehicle's interior). The one or more human machine interfaces 118 can provide data indicative of the user input to the one or more computing devices 110. In some implementations, the one or more remote computing devices 130 can receive input and can provide data indicative of the user input to the one or more computing devices 110. The one or more computing devices 110 can obtain the data indicative of the user input from the one or more remote computing devices 130 (e.g., via a wireless communication).

The one or more computing devices 110 can be configured to determine the state of the vehicle 104 and the environment around the vehicle 104 including the state of one or more objects external to the vehicle including pedestrians, cyclists, motor vehicles (e.g., trucks, and/or automobiles), roads, waterways, and/or buildings. Further, the one or more computing devices 110 can be configured to determine one or more physical characteristics of the one or more objects including physical dimensions of the one or more objects (e.g., shape, length, width, and/or height of the one or more objects). The one or more computing devices 110 can determine an estimated set of physical dimensions and/or orientations of the one or more objects, including portions of the one or more objects that are not detected by the one or more sensors 128, through use of one or more machine-learned models. Further, the one or more computing devices 110 can perform multiple-stage detection and/or recognition of objects based in part on use of the one or more machine-learned models.

Figure 2:
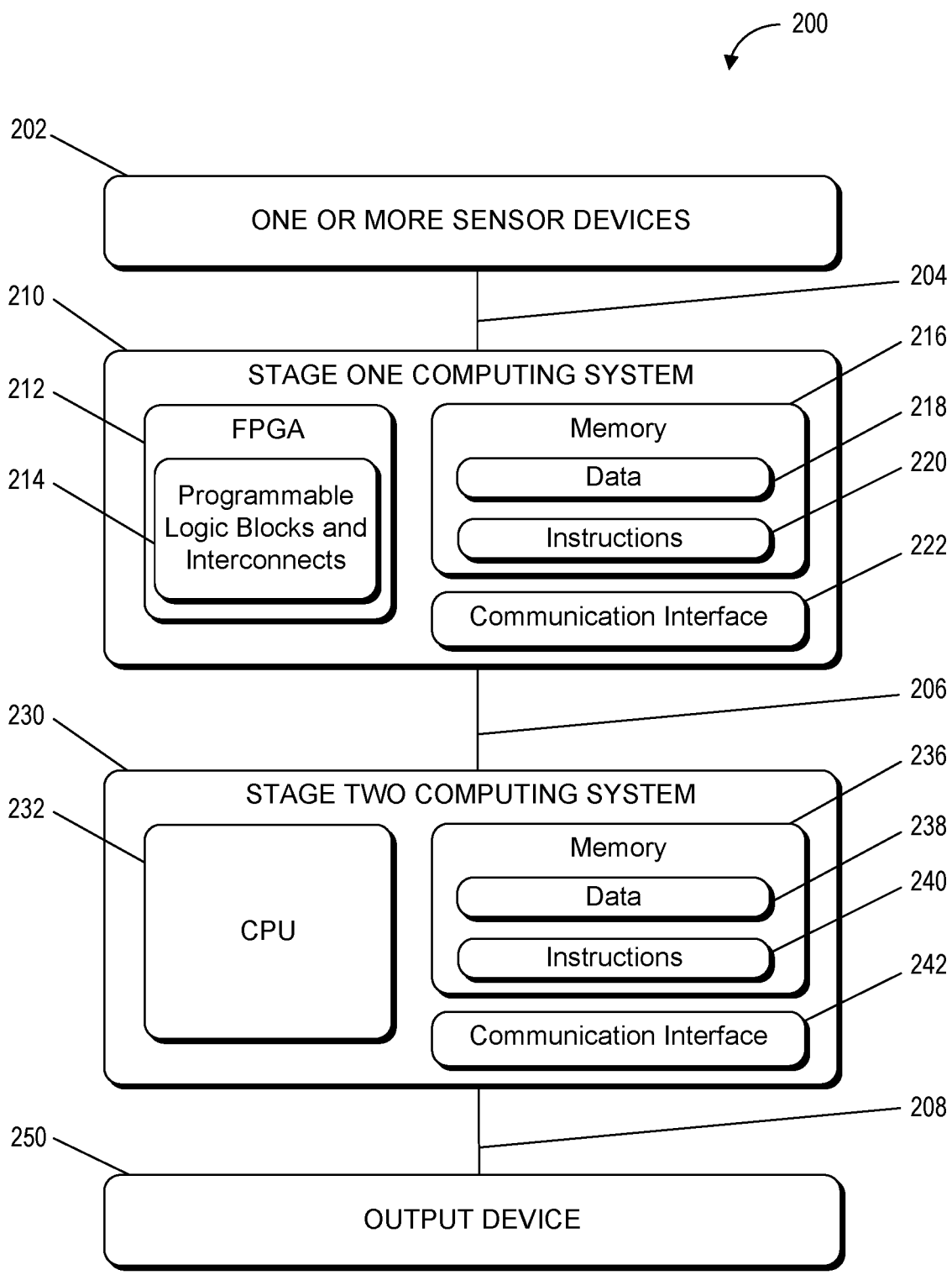
FIG. 2 depicts a diagram of an example multiple stage classification system according to example embodiments of the present disclosure.

FIG. 2 depicts a diagram of an example multiple stage classifier system according to example embodiments of the present disclosure. As illustrated, a multiple stage classifier system 200 can include one or more sensor devices 202; an interconnect 204/206/208; a first stage computing system 210; a field programmable gate array (FPGA) 212; one or more programmable logic blocks and interconnects 214; a memory 216; data 218; instructions 220; a communication interface 222; a second stage computing system 230; a central processing unit (CPU) 232; a memory 236; data 238; instructions 240; a communication interface 242; and one or more output devices 250. Further, the multiple stage classifier system 200 can perform one or more functions including receiving object data including portions of sensor data; determining, in a first stage of a multiple stage classification, first stage characteristics of the portions of sensor data based in part on a first machine-learned model; determining, in a second stage of the multiple stage classification, second stage characteristics of the portions of sensor data based in part on a second machine-learned model; and generating, an object output based in part on the first stage characteristics and the second stage characteristics, the object output including indications associated with detection of objects in the portions of sensor data.

In this example, the multiple stage classifier system 200 includes two computing systems, the first stage computing system 210 and the second stage computing system 230. However, in other embodiments the multiple stage classifier system 200 can include three or more computing systems, which can include any of the features, components, and/or devices included in the first stage computing system 210 and the second stage computing system 230.

The multiple stage classifier system 200 can include one or more sensor devices 202. The one or more sensor devices 202 can include one or more physical sensors that can generate one or more sensor outputs (e.g., sensor data) based in part on the detection of an environment including one or more objects. The one or more physical sensors can include one or more LIDAR devices, one or more cameras, one or more RADAR devices, one or more sonar devices, one or more image sensors, and/or one or more thermal imaging devices. Further, the one or more sensor devices 202 can include one or more simulated sensors that can generate one or more simulated sensor outputs (e.g., simulated sensor data) based in part on one or more simulated objects (e.g., simulated objects based in part on data structures generated by a computing device including the vehicle computing system 108, the one or more remote computing devices 130, and/or the operations computing system 150).

The object data output by the one or more sensor devices 202 can be used in the detection and/or recognition of one or more objects including one or more pedestrians (e.g., one or more persons standing, laying down, sitting, squatting, crouching, climbing, running, and/or walking); one or more other vehicles (e.g., motor vehicles including automobiles, trucks, buses, trolleys, trams, motorcycles, mopeds, aircraft, helicopters, boats, amphibious vehicles, and/or trains); one or more cyclists (e.g., one or more persons sitting and/or riding on a bicycle); transportation infrastructure (e.g., roads, streets, railroads, sidewalks, high-ways, parking lots, and/or pavement); and/or one or more buildings (e.g., houses, office buildings, stadia, and/or apartment buildings).

Further, the object data output by the one or more sensor devices 202 can include a set of three-dimensional points (e.g., x, y, and z coordinates) associated with one or more physical dimensions (e.g., the length, width, and/or height) of the one or more objects in the one or more images. One or more portions of the sensor data and/or the associated object data can be used to determine physical properties, attributes, and/or characteristics (e.g., visual properties and/or characteristics) of the one or more objects including the shape, texture, brightness, saturation, and/or physical dimensions (e.g., length, width, and/or height), of the one or more objects.

The object data generated by the one or more sensor devices 202 can be output as object data that includes one or more portions of the sensor data and/or one or more portions of the simulated sensor data. The one or more sensor devices 202 can generate object data that includes one or more two-dimensional images (e.g., two-dimensional images captured by one or more cameras) and/or three-dimensional images (e.g., three-dimensional point clouds captured by a LIDAR device). One or more portions of the object data can be sent to one or more computing devices and/or computing systems via one or more communication networks and/or interconnects including the interconnect 204 which can be used to exchange (e.g., send and/or receive) one or more signals and/or data including signals and/or data between the one or more sensor devices 202, the first stage computing system 210, and/or the second stage computing system 230.

The first stage computing system 210 can perform various operations and/or functions including sending, receiving, analyzing, detecting, recognizing, and/or processing one or more signals and/or data including the object data. For example, the first stage computing system 210 can receive (e.g., receive via the interconnect 204) object data from the one or more sensor devices 202, perform one or more operations (e.g., detect and/or recognize one or more objects) based on the object data, and send (e.g., send via the interconnect 206) the object data to the second stage computing device 230.

The first stage computing system 210 can include one or more computing devices including the one or more FPGAs 212 and the memory 216. The one or more FPGAs 212 can include any suitable processing device (e.g., a processor core, a microprocessor, an ASIC, a FPGA, a graphics processing unit, a digital signal processor, a controller, and/or a microcontroller) and can include one processor or a plurality of processors that are operatively connected. In this example, the one or more FPGAs 212 can include the one or more programmable logic blocks and interconnects 214 which can be configured according to the type of operations (e.g., processing data including the detection and/or recognition of objects) to be performed by the one or more FPGAs 212. In other embodiments, the one or more processors 212 can be configured not to include or not to use the one or more programmable logic blocks and interconnects 214.

The memory 216 can include one or more non-transitory computer-readable storage media, including RAM, ROM, EEPROM, EPROM, NVRAM, one or more memory devices, flash memory devices, and/or combinations thereof. The memory 216 can store information that can be accessed by the one or more FPGAs 212. For instance, the memory 216 (e.g., one or more non-transitory computer-readable storage mediums, memory devices) can store the data 218 that can be obtained, received, accessed, written, manipulated, created, and/or stored. The data 218 can include the object data from the one or more sensor devices 202, data identifying detected and/or classified objects including current object states and predicted object locations and/or trajectories, motion plans, classification models, and/or rules, as described herein. In some implementations, the first stage computing system 210 can obtain data from one or more memory devices that are remote from the first stage computing system 210 including, for example, the one or more sensor devices 202, and/or the second stage computing system 230.

The memory 216 can also store computer-readable instructions 220 that can be executed by the one or more processors 212. The instructions 220 can be software written in any suitable programming language or can be implemented in hardware. Additionally, or alternatively, the instructions 220 can be executed in logically and/or virtually separate threads on the one or more processors 212.

Further, the data 218 and/or the instructions 220 stored in the memory 216 can include one or more machine-learned models including one or more machine-learned models that can be used to generate classified object labels based on the object data. In some embodiments, the classified object labels associated with the one or more objects can be generated in the same format as the classified object labels generated by the machine-learned model.

For example, the first stage computing system 210 can include, use, and/or operate a machine-learned object detection and recognition model stored in the memory 216. The machine-learned object detection and recognition model can include one or more models including, neural networks (e.g., deep neural networks), or other multi-layer non-linear models.

Neural networks can include convolutional neural networks, recurrent neural networks (e.g., long short-term memory recurrent neural networks), feed-forward neural networks, and/or other forms of neural networks. Supervised training techniques can be performed to train the machine-learned object detection and recognition model to detect, recognize, and/or classify one or more objects in the object data. In some implementations, training data for the machine-learned object detection and recognition model can be based at least in part on the predicted detection outcomes determined using a rules-based model that can be used to train the machine-learned object detection and recognition model to detect, recognize, and/or classify one or more objects associated with the object data. Further, the training data can be used to train the machine-learned object detection and recognition model offline.

In some embodiments, the first stage computing system 210 can input data into the machine-learned object detection and recognition model and receive an output. For instance, the first stage computing system 210 can obtain data indicative of a machine-learned object detection and recognition model from the one or more remote computing devices that store various machine-learned object detection and recognition models. The input data can include the data associated with the one or more objects including one or more vehicles, pedestrians, cyclists, buildings, and/or environments associated with the one or more objects (e.g., roads, bodies of water, mountains, hills, and/or foliage). In some embodiments, the input data can include data associated with a visual descriptor including color, brightness, and/or saturation information associated with the one or more objects.

Further, the input data can include the object data, prediction data (e.g., data predicting the state and/or location of the one or more objects), a motion plan (e.g., the motion plan for a vehicle to navigate relative to the one or more objects), and/or map data associated with the one or more objects.

The machine-learned object detection and recognition model can process the input data to detect, recognize, and/or classify the one or more objects. Moreover, the machine-learned object detection and recognition model can predict one or more interactions for the one or more objects. Further, the first stage computing system 210 can obtain an output from the machine-learned object detection and recognition model. The output from the machine-learned object detection and recognition model can be indicative of the one or more predicted detections, recognitions, and/or classifications of the one or more objects. In some implementations, the output can also be indicative of a probability associated with each respective detection, recognition, and/or classification. Further, the machine-learned object detection and recognition model can process the input data to determine which of the one or more portions of an input image in the input data is background (e.g., an area in an input image included in the input data that does not include one or more objects of interest) or foreground (e.g., an area in an input image included in the input data that includes one or more objects that are of interest). For example, the machine-learned object detection and recognition model can determine, in a first stage of processing the input data performed by the first stage computing system 210, that an area of an input image is determined to be background (e.g., a portion of the input image that includes an object that is the sky or the ground) and the machine-learned object detection and recognition model can determine in a second stage of processing the input data performed by the second stage computing system 230, that an area of an input image is determined to be foreground (e.g., a portion of the input image that includes an object that is a vehicle or a pedestrian). The first stage computing system 210 can also include a communication interface 222 that can be used to communicate with one or more systems or devices, including systems or devices that are remote from the first stage computing system 210. The communication interface 222 can include any circuits, components, and/or software, for communicating with one or more networks. In some implementations, the communication interface 222 can include, for example, one or more of a communications controller, receiver, transceiver, transmitter, port, conductors, software and/or hardware for communicating data. Further, the first stage computing system 210 can send one or more signals and/or data (e.g., one or more signals associated with the object data) to one or more computing systems including the second stage computing system 230 and/or the one or more output devices 250.

The second stage computing system 230 can perform various operations and/or functions including sending, receiving, analyzing, detecting, recognizing, and/or processing one or more signals and/or data including the object data. For example, the second stage computing system 230 can receive (e.g., receive via the interconnect 204) object data from the first stage computing system 210, perform one or more operations (e.g., detect and/or recognize one or more objects) based on the object data, and send (e.g., send via the interconnect 208) one or more signals associated with the object data to the one or more output devices 250.

The second stage computing system 230 can include one or more computing devices including the one or more processors 232 and the memory 236. The one or more processors 232 can include any suitable processing device (e.g., a processor core, a microprocessor, an ASIC, a FPGA, a graphics processing unit, a digital signal processor, a controller, and/or a microcontroller) and can include one processor or a plurality of processors that are operatively connected. In some embodiments, the one or more processors 232 can include one or more programmable logic blocks and interconnects (not shown) which can be configured according to the type of operations (e.g., processing data including the detection and/or recognition of objects) to be performed by the one or more processors 232.

The memory 236 can include one or more non-transitory computer-readable storage media, including RAM, ROM, EEPROM, EPROM, NVRAM, one or more memory devices, flash memory devices, and/or combinations thereof. The memory 236 can store information that can be accessed by the one or more processors 232. For instance, the memory 236 (e.g., one or more non-transitory computer-readable storage mediums, memory devices) can store the data 238 that can be obtained, received, accessed, written, manipulated, created, and/or stored. The data 238 can include the object data from the one or more sensor devices 202, the first stage computing system 210, data identifying detected and/or classified objects including current object states and predicted object locations and/or trajectories, motion plans, classification models, rules, as described herein. In some implementations, the second stage computing system 230 can obtain data from one or more memory devices that are remote from the second stage computing system 230 including, for example, the one or more sensor devices 202, and/or the first stage computing system 210.

The memory 236 can also store computer-readable instructions 240 that can be executed by the one or more processors 232. The instructions 240 can be software written in any suitable programming language or can be implemented in hardware. Additionally, or alternatively, the instructions 240 can be executed in logically and/or virtually separate threads on the one or more processors 232.

Further, the data 238 and/or the instructions 240 stored in the memory 236 can include one or more machine-learned models including one or more machine-learned models that can be used to generate classified object labels based on the object data and/or data associated with the object data (e.g., data received from the first stage computing system 210). In some embodiments, the classified object labels associated with the one or more objects can be generated in the same format as the classified object labels generated by the machine-learned model.

For example, the second stage computing system 230 can include, use, and/or operate a machine-learned object detection and recognition model stored in the memory 236. The machine-learned object detection and recognition model can include one or more models including, neural networks (e.g., deep neural networks), or other multi-layer non-linear models.

Neural networks can include convolutional neural networks, recurrent neural networks (e.g., long short-term memory recurrent neural networks), feed-forward neural networks, and/or other forms of neural networks. Supervised training techniques can be performed to train the machine-learned object detection and recognition model to detect, recognize, and/or classify one or more objects in the object data. In some implementations, training data for the machine-learned object detection and recognition model can be based at least in part on the predicted detection outcomes determined using a rules-based model that can be used to train the machine-learned object detection and recognition model to detect, recognize, and/or classify one or more objects associated with the object data. Further, the training data can be used to train the machine-learned object detection and recognition model offline.

In some embodiments, the second stage computing system 230 can input data into the machine-learned object detection and recognition model and receive an output. For instance, the second stage computing system 230 can obtain data indicative of a machine-learned object detection and recognition model from the one or more remote computing devices that store various machine-learned object detection and recognition models. The input data can include the data associated with the one or more objects including one or more vehicles, pedestrians, cyclists, buildings, and/or environments associated with the one or more objects (e.g., roads, bodies of water, mountains, hills, and/or foliage). Further, the input data can include the object data, prediction data (e.g., data predicting the state and/or location of the one or more objects), a motion plan (e.g., the motion plan for the one or more object), and/or map data associated with the one or more objects.

The machine-learned object detection and recognition model can process the input data to detect, recognize, and/or classify the one or more objects. Moreover, the machine-learned object detection and recognition model can predict one or more interactions for the one or more objects. Further, the second stage computing system 230 can obtain an output from the machine-learned object detection and recognition model. The output from the machine-learned object detection and recognition model can be indicative of the one or more predicted detections, recognitions, and/or classifications of the one or more objects. In some implementations, the output can also be indicative of a probability associated with each respective detection, recognition, and/or classification.

The second stage computing system 230 can also include a communication interface 242 that can be used to communicate with one or more systems or devices, including systems or devices that are remote from the second stage computing system 230. The communication interface 242 can include any circuits, components, and/or software, for communicating with one or more networks. In some implementations, the communication interface 242 can include, for example, one or more of a communications controller, receiver, transceiver, transmitter, port, conductors, software and/or hardware for communicating data. Further, the second stage computing system 230 can send one or more signals and/or data (e.g., one or more signals associated with the object data) to one or more computing systems including the first stage computing system 210 and/or the one or more output devices 250.

The one or more output devices 250 can receive one or more signals or data from one or more computing devices or computing systems including the first stage computing system 210 and/or the second stage computing system 230. The one or more output devices 250 can receive (e.g., receive one or more signals from the second stage computing system 230 via the interconnect 208) one or more signals associated with the object data including one or more signals that are used to produce one or more visual images associated with the object data and/or output associated with the output data (e.g., the results of processing the object data by the first stage computing system 210 and/or the second stage computing system 230). For example, the one or more output devices 250 can, based on one or more signals from the second stage computing system 230, generate visual output including an image and indications of portions of the image that include one or more objects.

The one or more output devices 250 can include one or more devices that are used to generate a representation associated with one or more signals and/or data received by the one or more output devices 250. For example, the one or more output devices 250 can include one or more display devices (e.g., organic light emitting diode display devices, liquid crystal display devices, cathode ray tube display devices, and/or plasma display devices); one or more audio output devices (e.g., loud speakers); and/or one or more haptic output devices (e.g., piezoelectric devices that can produce one or more vibrations).

Figure 3:
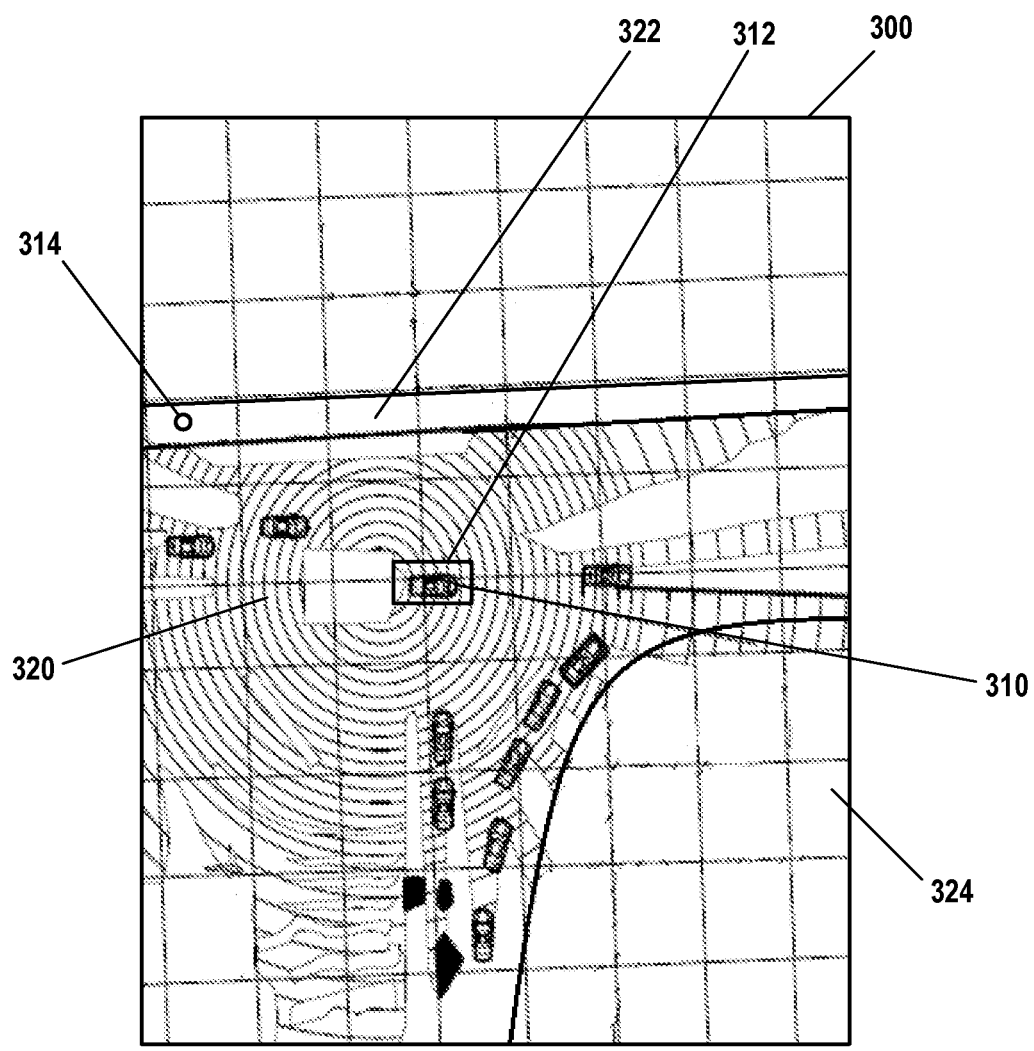
FIG. 3 depicts an example of object detection from an overhead view using a multiple stage classifier according to example embodiments of the present disclosure.

FIG. 3 depicts an example of object detection from an overhead view using a multiple stage classifier according to example embodiments of the present disclosure. The output can be based in part on the detection, recognition, and/or processing of one or more portions of an environment by one or more devices (e.g., one or more computing devices) or systems including, for example, the vehicle 104, the vehicle computing system 108, or the operations computing system 150, shown in FIG. 1; or the multiple stage classifier system 200 shown in FIG. 2. Moreover, the detection, recognition, and/or processing of one or more portions of an environment can be implemented as an algorithm on the hardware components of one or more devices or systems (e.g., the vehicle 104, the vehicle computing system 108, and/or the operations computing system 150, shown in FIG. 1 or the multiple stage classifier system 200 shown in FIG. 2). Further, the multiple stage classifier in FIG. 3 can perform one or more operations including receiving object data including portions of sensor data; determining, in a first stage of a multiple stage classification, first stage characteristics of the portions of sensor data based in part on a first machine-learned model; determining, in a second stage of the multiple stage classification, second stage characteristics of the portions of sensor data based in part on a second machine-learned model; and generating, an object output based in part on the first stage characteristics and the second stage characteristics, the object output including indications associated with detection of objects in the portions of sensor data. As illustrated, FIG. 3 shows an output image 300; an object 310; a bounding shape 312; an object 314 (e.g., a pedestrian); an object 320 (e.g., a road); an object 322 (e.g., a sidewalk); and a segment 324.

The output image 300 depicts an image which can be based on, or associated with object data (e.g., object data from the multiple stage classifier system 200). For example, the output image 300 can be based in part on sensor outputs from one or more image sensors (e.g., one or more cameras) including the one or more sensor devices 202. As shown, the output image 300 includes an object 310 (e.g., an autonomous vehicle), a bounding shape 312 (e.g., a bounding shape around the object 310), an object 314 (e.g., a pedestrian), an object 320 (e.g., a road), and an object 322 (e.g., a sidewalk).

As shown in FIG. 3, the output image 300 can be divided into a plurality of segments including the segment 324, although in other embodiments the output image 300 can include more segments, fewer segments, or no segments at all. In some embodiments, different segments within the output image 300 can be obtained using a sliding window having a predetermined segment size. In some embodiments, the output image can be resized into a plurality of representations of data having different scales. By analyzing multiple data representations using a sliding window of fixed size, objects partially captured by a sliding window in some image representations can be fully captured by a sliding window in one or more other image representations.

Each of the plurality of segments can be analyzed (e.g., processed by using a machine-learned classification model including the machine-learned object detection and recognition model used by the multiple stage classifier system 200). For example, first stage computing system 210 within a multiple stage classifier system 200 can process each of the plurality of segments within output image 300 to determine whether each segment corresponds to a portion of background (e.g., a segment that does not include one or more objects of interest) or foreground (e.g., a segment that includes one or more objects that are of interest). In this example, the segment 324 is empty to indicate that the segment 324 contains a background portion. In other embodiments, the segments that are foreground and/or background can be indicated by different patterns, shapes, or colors. Further, in some embodiments, determination of whether each of the plurality of segments is foreground or background can be based in part on map data which can indicate for instance, the portions of a map associated with an area that includes streets, buildings, and other areas that can be classified as background.

Referring still to FIG. 3, for segments of output image 300 that are determined by a first stage computing system (e.g., first stage computing system 210 of FIG. 2) to correspond to foreground portions, such segments can be provided to a second stage computing system (e.g., second stage computing system 230 of FIG. 2) for further processing. Second stage computing system 230 within multiple stage classifier system 200 can process each of the plurality of segments determined to correspond to foreground portions to more particularly detect and classify particular objects of interest (e.g., object 310 (e.g., an autonomous vehicle), object 314 (e.g., a pedestrian)

Figure 4:
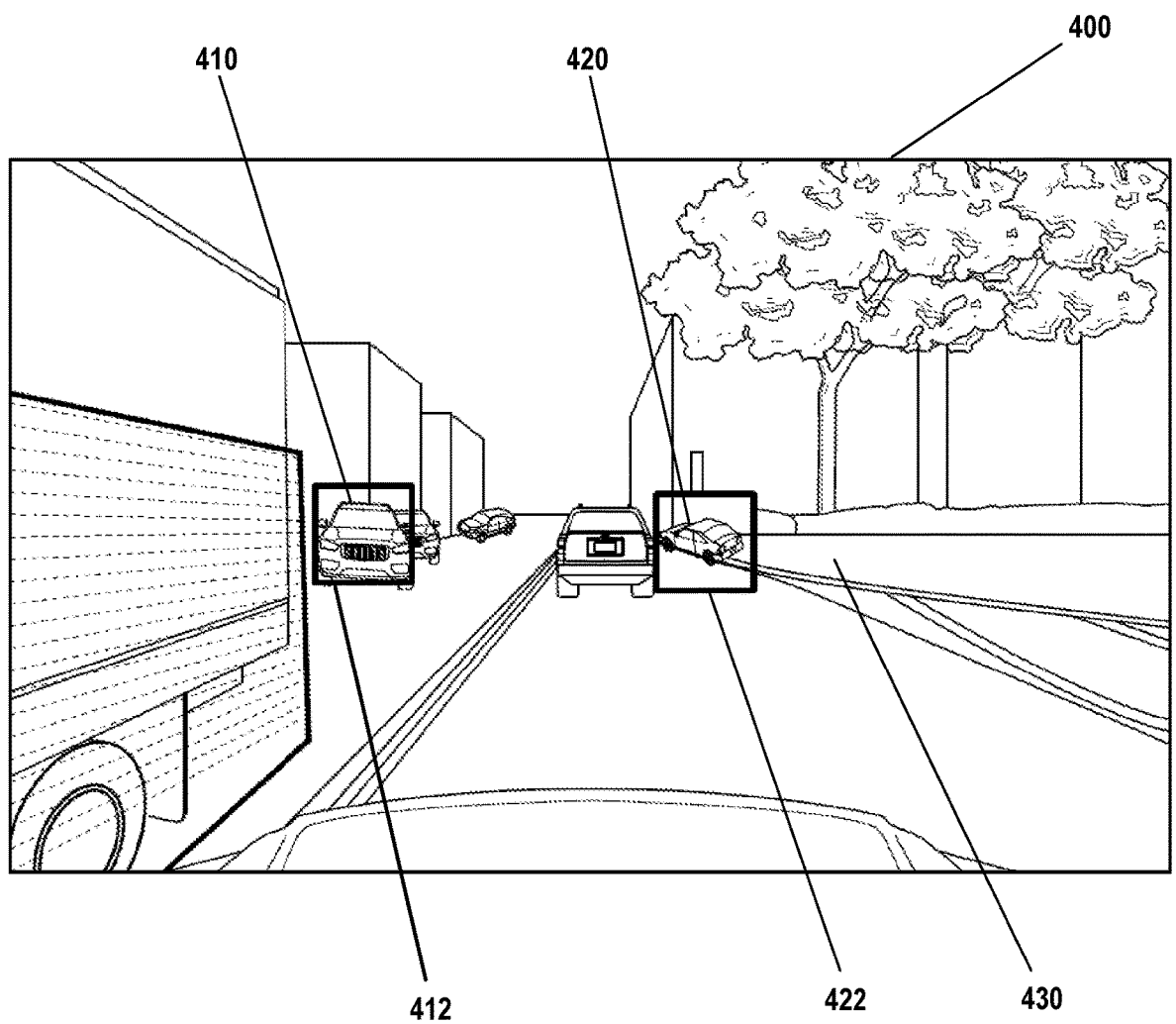
FIG. 4 depicts an example of object detection and use of decision trees by a multiple stage classifier according to example embodiments of the present disclosure.
Figure 4:

FIG. 4 depicts an example of object detection and use of decision trees by a multiple stage classifier according to example embodiments of the present disclosure. The output can be based in part on the detection and/or processing of one or more portions of an environment by one or more devices (e.g., one or more computing devices) or systems including, for example, the vehicle 104, the vehicle computing system 108, and/or the operations computing system 150, shown in FIG. 1; or the multiple stage classifier system 200 shown in FIG. 2. Moreover, the detection and processing of one or more portions of an environment can be implemented as an algorithm on the hardware components of one or more devices or systems (e.g., the vehicle 104, the vehicle computing system 108, and/or the operations computing system 150, shown in FIG. 1) to, for example, determine the physical dimensions, position, shape, and/or orientation of objects. Further, the multiple stage classifier in FIG. 4 can perform one or more operations including receiving object data including portions of sensor data; determining, in a first stage of a multiple stage classification, first stage characteristics of the portions of sensor data based in part on a first machine-learned model; determining, in a second stage of the multiple stage classification, second stage characteristics of the portions of sensor data based in part on a second machine-learned model; and generating, an object output based in part on the first stage characteristics and the second stage characteristics, the object output including indications associated with detection of objects in the portions of sensor data. As illustrated, FIG. 4 shows an output image 400; an object 410; a bounding area 412; a classification model 414; an object 420; a bounding area 422; a classification model 424, and a sidewalk area 430.

The output image 400 depicts an image which can be based on, or associated with object data (e.g., object data from the multiple stage classifier system 200). As shown, the output image includes an object 410 (e.g., a vehicle), a bounding area 412 (e.g., an area surrounding the object 410), a classification model 414 (e.g., a classification model including one or more of the machine-learned object detection and recognition models used by the first stage computing system 210 of the multiple stage classifier system 200), an object 420 (e.g., an object that is not a vehicle), a bounding area 422 (e.g., an area surrounding the object 420), and a classification model 424 (e.g., a classification model including one or more of the machine-learned object detection and recognition models used by the second stage computing system of the multiple stage classifier system 200).

When the portion of the output image 400 within the bounding area 412 is provided as input to the classification model 414, the classification model 414 can generate an output indicating that the object detected within the boundary area 412 is not a background (e.g., the object detected within the boundary area 412 is of interest). When the portion of the output image 400 within the bounding area 412 is provided as input to the classification model 424, the classification model 424 can generate an output indicating that the object detected within the boundary area 412 is a vehicle.

In this example, the object 420 (e.g., the vehicle) is located on the sidewalk area 430, which according to a heat map associated with the output image 400 is a portion of the output image 400 that is less likely to be occupied by a vehicle. When the portion of the output image 400 within the bounding area 422 is provided as input to the classification model 414, the classification model 414 can generate an output indicating that the object detected within the boundary area 422 is not background (e.g., the object detected within the boundary area 422 is of interest). When the portion of the output image 400 within the bounding area 422 is provided as input to the classification model 424, the classification model 424 can generate an output indicating that the object detected within the boundary area 422 is a vehicle. In this example, the heat map decreased the probability of a vehicle being within the bounding area 422, however, the other characteristics of the object 420 determined by the multiple stage classifier system 200 can result in the determination that the object 420 is a vehicle.

Figure 5:
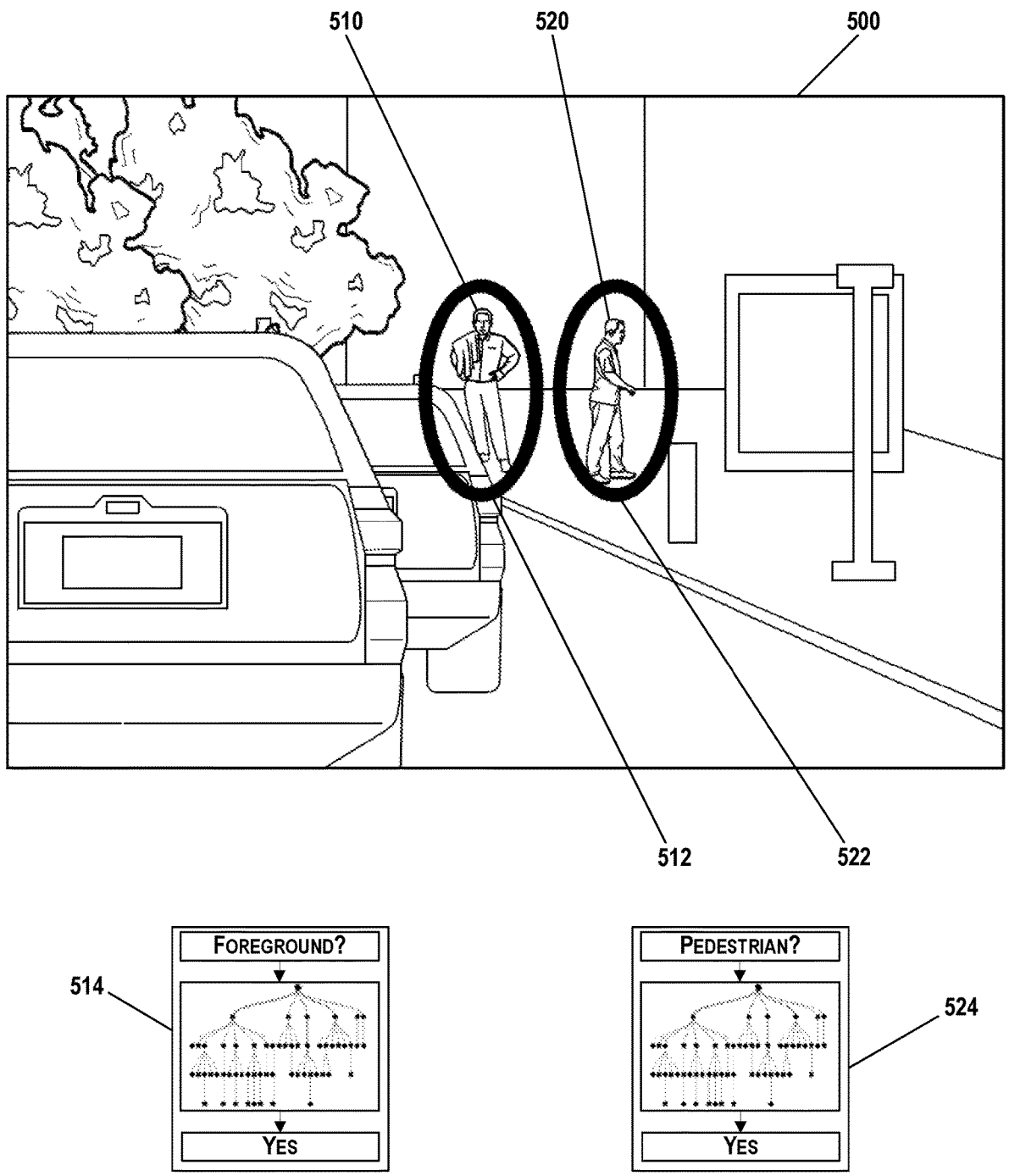
FIG. 5 depicts a second example of object detection and use of a decision tree by a multiple stage classifier according to example embodiments of the present disclosure.

FIG. 5 depicts a second example of object detection and use of a decision tree by a multiple stage classifier according to example embodiments of the present disclosure. The output can be based in part on the detection and/or processing of one or more portions of an environment by one or more devices (e.g., one or more computing devices) or systems including, for example, the vehicle 104, the vehicle computing system 108, and/or the operations computing system 150, shown in FIG. 1; or the multiple stage classifier system 200 shown in FIG. 2. Moreover, the detection and processing of one or more portions of an environment can be implemented as an algorithm on the hardware components of one or more devices or systems (e.g., the vehicle 104, the vehicle computing system 108, and/or the operations computing system 150, shown in FIG. 1) to, for example, determine the physical dimensions, position, shape, and/or orientation of objects. Further, the multiple stage classifier in FIG. 5 can perform one or more operations including receiving object data including portions of sensor data; determining, in a first stage of a multiple stage classification, first stage characteristics of the portions of sensor data based in part on a first machine-learned model; determining, in a second stage of the multiple stage classification, second stage characteristics of the portions of sensor data based in part on a second machine-learned model; and generating, an object output based in part on the first stage characteristics and the second stage characteristics, the object output including indications associated with detection of objects in the portions of sensor data. As illustrated, FIG. 5 shows an output image 500, an object 510; a bounding area 512; a classification model 514; an object 520; a bounding area 522; and a classification model 524.

The output image 500 depicts an image which can be based on, or associated with object data (e.g., object data from the multiple stage classifier system 200). As shown, the output image includes an object 510 (e.g., a pedestrian), a bounding area 512 (e.g., an area surrounding the object 510), a classification model 514 (e.g., a classification model including one or more of the machine-learned object detection and recognition models used by first stage computing system 210 of the multiple stage classifier system 200), an object 520 (e.g., a pedestrian), a bounding area 522 (e.g., an area surrounding the object 520), and a classification model 524 (e.g., a classification model including one or more of the machine-learned object detection and recognition models used by the second stage computing system 230 of the multiple stage classifier system 200).

When the portion of the output image 500 within the bounding area 512 is provided as input to the classification model 514, the classification model 514 can generate an output indicating that the object detected within the boundary area 512 is foreground. Further, when the portion of the output image 500 within the bounding area 512 is provided as input to the classification model 524, the classification model 524 can generate an output indicating that the object detected within the boundary area 512 is a pedestrian.

Furthermore, in this example, the object 520 is located on a portion of the output image, that according to a map (e.g., a map of the geographical area associated with the output image 500) is a portion (e.g., a sidewalk portion) of the output image 500 that is more likely to be occupied by a pedestrian. When the portion of the output image 500 within the bounding area 522 is provided as input to the classification model 514, the classification model 514 can generate an output indicating that the object detected within the boundary area 522 is foreground. Further, when the portion of the output image 500 within the bounding area 522 is provided as input to the classification model 524, the classification model 524 can generate an output indicating that the object detected within the boundary area 522 is a pedestrian. In this example, the map associated with the output image 500 increased the probability of a pedestrian being within the bounding area 522, and, in conjunction with the other characteristics of the object 520 determined by the multiple stage classifier system 200, the classification model 514 has output the result that the object 520 is foreground and the classification model 524 has output the result that the object 520 is a pedestrian.

Figure 6:
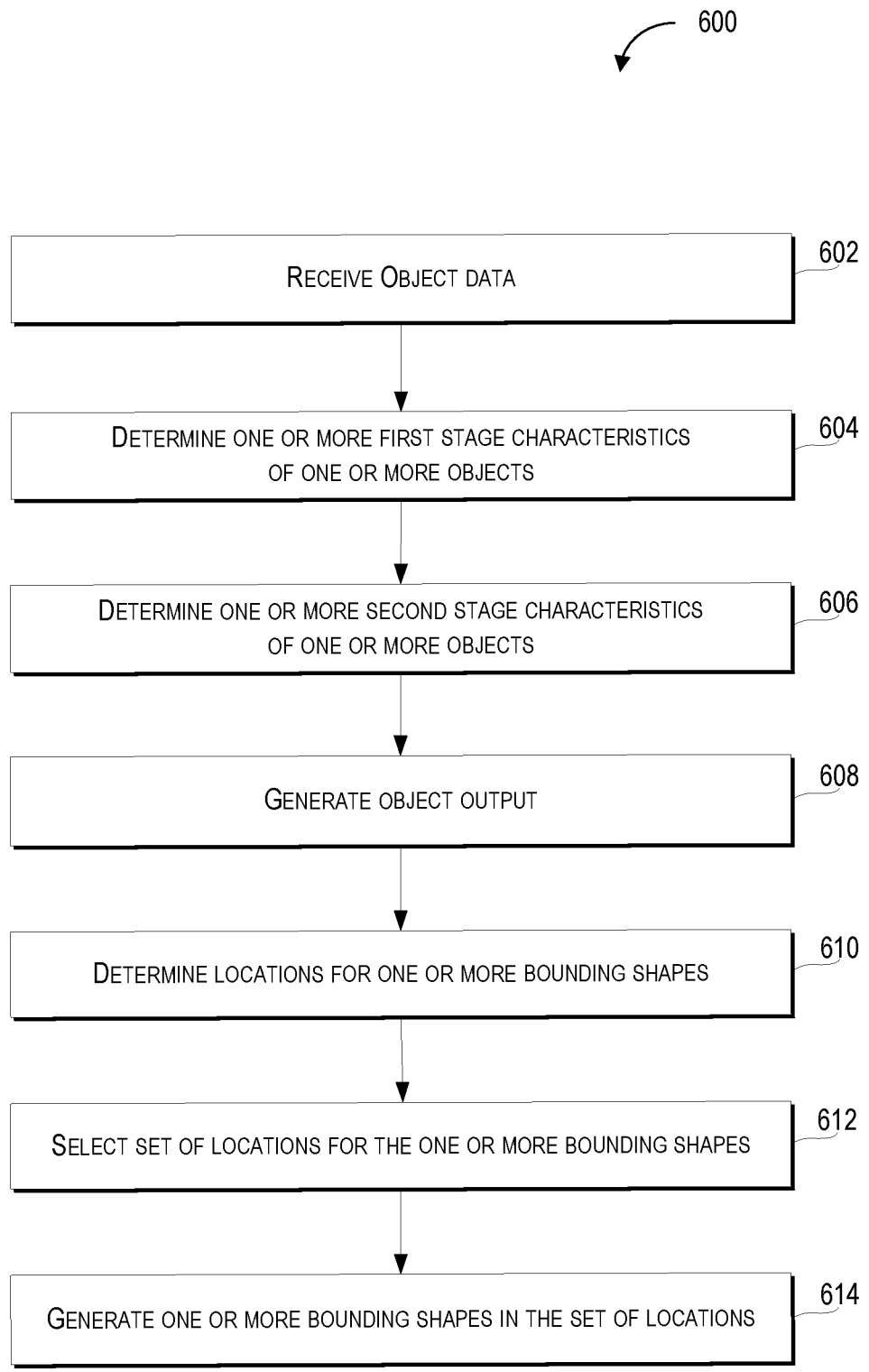
FIG. 6 depicts a flow diagram of an example method of object detection and recognition according to example embodiments of the present disclosure.

FIG. 6 depicts a flow diagram of an example method of object detection and recognition according to example embodiments of the present disclosure. One or more portions of the method 600, illustrated in FIG. 6, can be implemented by one or more devices (e.g., one or more computing devices) or systems including, for example, the vehicle 104, the vehicle computing system 108, or the operations computing system 150, shown in FIG. 1; or the multiple stage classifier system 200, shown in FIG. 2. Moreover, one or more portions of the method 600 can be implemented as an algorithm on the hardware components of the devices described herein (e.g., as in FIG. 1) to, for example, perform multiple-stage detection and/or recognition of objects including receiving object data, determining characteristics of one or more objects, and generating object output associated with detection of one or more objects. FIG. 6 depicts elements performed in a particular order for purposes of illustration and discussion. Those of ordinary skill in the art, using the disclosures provided herein, will understand that the elements of any of the methods discussed herein can be adapted, rearranged, expanded, omitted, combined, and/or modified in various ways without deviating from the scope of the present disclosure.

At 602, the method 600 can include receiving object data including one or more portions of sensor data. For example, the first stage computing system 210 of the multiple stage classifier system 200 can receive object data from one or more computing devices and/or one or more sensor devices including the one or more sensor devices 202.

In some embodiments, the one or more portions of sensor data (e.g., one or more portions or segments of one or more images associated with the sensor data) can be based in part on sensor output from one or more sensors (e.g., physical sensors that detect actual objects and/or phenomena) and/or one or more simulated sensors (e.g., simulated sensor outputs generated by one or more computing devices). The one or more sensors can include one or more light detection and ranging devices (LIDAR), one or more cameras, one or more radar devices, one or more sonar devices, and/or one or more thermal imaging devices.

For example, the one or more portions of sensor data and/or the object data can include two-dimensional images including images captured by one or more cameras and/or three-dimensional point clouds captured by a LIDAR device. The one or more portions of sensor data can be analyzed to detect and/or recognize one or more objects including one or more pedestrians; one or more other vehicles; transportation infrastructure; one or more cyclists; and/or one or more buildings. Further, the object data can include a set of three-dimensional points (e.g., x, y, and z coordinates) associated with one or more physical dimensions (e.g., the length, width, and/or height) of the one or more objects in the one or more images.

At 604, the method 600 can include determining one or more characteristics of the one or more portions of sensor data (e.g., the one or more portions of sensor data in 602). In particular, the method 600 can include determining, in a first stage of a multiple stage classification (e.g., classification including two or more stages) which can include the use of one or more hardware components (e.g., a configurable hardware component which can include a FPGA), one or more first stage characteristics of the one or more portions of sensor data based in part on a first machine-learned model (e.g., the machine-learned object detection and recognition model used by the first stage computing system 210). For example, the first stage computing system 210 can determine one or more characteristics of one or more portions of sensor data received from the one or more sensor devices 202, and can perform the determination using a machine-learned object detection and recognition model that has been trained to detect and/or recognize one or more objects including streets, buildings, the sky, vehicles, pedestrians, and/or cyclists.

In some embodiments, the object detection system can determine, in a first stage of a multiple stage classification, one or more first stage characteristics of the one or more portions of sensor data based in part on traversal of a first portion of a first machine-learned model (e.g., a first machine-learned model associated with data which can include the object data). In some embodiments, the first machine-learned model used by the object detection system can be based in part on one or more classification techniques including a random forest classifier, neural network, gradient boosting, a support vector machine, a logistic regression classifier, and/or a boosted forest classifier.

In some embodiments, the first stage of the multiple stage classification can include traversal of a first portion that includes a first plurality of nodes associated with a plurality of classifier labels (e.g., machine-learned model classifier labels). Each of the first plurality of nodes in the first portion can be associated with a classifier label that is used to classify, categorize and/or determine the one or more first stage characteristics of the one or more portions of sensor data. For example, the first stage of the multiple stage classification can include a determination of the one or more first stage characteristics including the portions of the one or more portions of sensor data that are background (e.g., the one or more portions of the sensor data that are associated with objects that are not of interest including a street surface and/or a sky) and the portions of the one or more portions of sensor data that are foreground (e.g., the one or more portions of the sensor data that are associated with objects that are of interest including a vehicle, a pedestrian, and/or a cyclist). Accordingly, the object detection system can provide a first stage output (i.e., data associated with the one or more first stage characteristics) that allows the second stage of the multiple stage classification to more efficiently process the one or more portions of sensor data by determining in advance (e.g., in the first or earlier stages of the multiple stage classification) the areas of the one or more portions of sensor data to focus on for purposes of object detection and/or recognition.

In some embodiments, the first stage of the multiple stage classification can be performed by one or more hardware components of the one or more computing devices including an FPGA, a digital signal processor (DSP), an application specific integrated circuit (ASIC), or a graphics processing unit (GPU). By way of example, using a GPU can leverage the parallel processing capabilities of the GPU, which can improve processing effectiveness and result in object detection, recognition, and/or image processing that exceeds the speed of other techniques that do not process the images in parallel (e.g., serial processing of the one or more images).

At 606, the method 600 can include determining, characteristics of the one or more portions of sensor data. In some embodiments, the method 600 can include determining characteristics of the one or more portions of sensor data (e.g., the one or more portions of sensor data in 602 and/or 604) in a second stage of the multiple stage classification, one or more second stage characteristics of the one or more portions of sensor data based in part on a second machine-learned model. For example, the second stage computing system 230 can determine one or more characteristics of one or more portions of sensor data received from the one or more sensor devices 202 and/or the first stage computing system 210, and can perform the determination using a machine-learned object detection and recognition model that has been trained to detect and/or recognize one or more objects including streets, buildings, the sky, vehicles, pedestrians, and/or cyclists.

In some embodiments, the one or more first stage characteristics and/or the one or more second stage characteristics can be determined using a first machine-learned model and a second machine-learned model respectively. The first machine-learned model can include a first plurality of nodes associated with a first plurality of classifier labels and the second machine-learned model can include a second plurality of nodes associated with a second plurality of classifier labels.

In some embodiments, the first machine-learned model (the machine-learned object detection and recognition model in 604) and/or the second machine-learned model (the machine-learned object detection and recognition model in 606) can be based in part on one or more classification techniques including a neural network, a random forest classifier, gradient boosting, a support vector machine, a logistic regression classifier, or a boosted forest classifier.

In some embodiments, the one or more first stage characteristics determined at 604 can include an indication of when or whether a portion of the one or more portions of sensor data is foreground or background and the one or more second stage characteristics determined at 606 can include an object classification of a foreground portion of the one or more portions of sensor data. For example, the first stage computing system 210 can determine the one or more portions of sensor data that include background (e.g., the sky and/or street surfaces). These background portions can be excluded from subsequent analysis by the second stage computing system. When the first stage computing system determines one or more portions of sensor data to include foreground, then the second stage computing system 230 can further analyze the one or more foreground portions of sensor data to detect and/or classify objects therein (e.g., vehicles and/or pedestrians or other objects of interest).

The second stage of the multiple stage classification can include implementation of a second machine-learned model that includes a second plurality of nodes associated with the second plurality of classifier labels. For example, each of the plurality of nodes in the second machine-learned model can be associated with a classifier label that is used to classify, categorize and/or determine the one or more first stage characteristics of the one or images. For example, the second stage of the multiple stage classification can include a determination of the one or more second stage characteristics of the one or more images including the location and identity of one or more objects (e.g., the location of pedestrians in the one or more images).

The second stage of the multiple stage classification can include determining one or more second stage characteristics of the one or more images that are based in part on the output of the first stage. The one or more second stage characteristics can include the one or more first stage characteristics (e.g., if a background characteristic is determined in the first stage a background characteristic can be further determined, to a greater level of confidence, in the second stage). Further, the one or more second stage characteristics can include characteristics that were not determined in the first stage. For example, if one or more objects (e.g., pedestrians, vehicles, and/or cyclists) were not determined in the first stage, the one or more objects can be determined in the second stage.

In some embodiments, the second machine-learned model can include a second plurality of nodes that is equal or greater in number than the first plurality of nodes in the first machine-learned model. For example, the first machine-learned model can include five-hundred (500) nodes, while the second machine-learned model can include one-thousand five-hundred (1500) nodes. Because a subset of the object data received at 602 is analyzed by both the first machine-learned model and the second machine-learned model (e.g., second stage characteristics determined at 606 can be determined for foreground portions of object data), then data processing using separate first and second models can be significantly faster as compared with a single model that includes two-thousand (2000) nodes of similar nature. In addition, the second machine-learned model can allow for a deeper second-model analysis that can include more classifier labels and can be traversed for greater accuracy in detecting and/or identifying the one or more objects after the first model analysis.

In some embodiments, parts of the second stage of the multiple stage classification can be performed by one or more software components (e.g., software applications that execute one or more program instructions) of the one or more computing devices including one or more software components that operate or are executed on one or more central processing units.

At 608, the method 600 can include generating an object output based in part on the one or more first stage characteristics and the one or more second stage characteristics. The object output can include one or more indications associated with detection of one or more objects in the one or more portions of sensor data.

For example, the multiple stage classifier system 200 can generate an object output based in part on data associated with the one or more first stage characteristics (e.g., data generated by the first stage computing system 210) and/or data associated with the one or more second stage characteristics (e.g., data generated by the second stage computing system 230). The object output can include one or more indications or signs associated with detection of one or more objects in the one or more portions of sensor data. In some embodiments, the object output can include, for each of the one or more objects, one or more indications of whether an object was detected; the type of object that was detected; the location of the object detected; the physical characteristics of the object detected; the velocity and/or acceleration of the object detected; and/or a probability associated with an estimated accuracy of the object detection.

In some embodiments, the object output generated at 608 can be used by one or more vehicle systems (e.g., vehicle systems used to control the operation of a vehicle including an autonomous vehicle) to perform one or more actions including activating vehicle systems based on detection of the one or more objects (e.g., activating brakes when an object is within a predetermined proximity of the vehicle); modifying the path of the vehicle (e.g., maneuver the vehicle around objects including buildings, vehicles, and/or pedestrians); and/or exchange the object output with one or more vehicle systems or remote computing systems (e.g., the object output can be sent to other vehicles to improve object detection by other vehicles that may have reduced sensor coverage or capacity).

At 610, the method 600 can include determining, based in part on the object output generated at 608, locations for one or more bounding shapes associated with the one or more objects in the one or more images. For example, the multiple stage classifier system 200 can determine, based in part on the object output, locations for one or more bounding shapes (e.g., two-dimensional or three-dimensional bounding polygons and/or bounding ellipses) associated with the one or more objects in the one or more portions of sensor data. The object detection system can use the first machine-learned model and/or the second machine-learned model to determine the one or more locations or areas of the sensor data that are more likely to contain an object or a certain type of object (e.g., in an image in which the ground is part of the lower half of the image and the sky is part of the upper half of the image, a motor vehicle or cyclist is more likely to be in the lower half of the image than the upper half of an image).

At 612, the method 600 can include selecting, based in part on an image processing technique including non-maximum suppression, a set of the locations for the one or more bounding shapes. For example, the multiple stage classifier system 200 can select a set of the locations in which to generate the one or more bounding shapes. For example, by analyzing the image gradient direction, pixels that are not part of the local maxima for the portion of the sensor data corresponding to each of the set of locations can be suppressed.

At 614, the method 600 can include generating the one or more bounding shapes in the set of the locations for the one or more bounding shapes. For example, the multiple stage classifier system 200 can, based on the set of locations for the one or more bounding shapes, generate the one or more bounding shapes in the selected locations. In some embodiments, the one or more bounding shapes can be represented on a display device (e.g., an LCD display) as polygons (e.g., one or more squares and/or rectangles) and/or ellipses (e.g., one or more circles and/or ovals) generated to fully enclose or partly cover a portion of the display output in which an object is detected.

Figure 7:
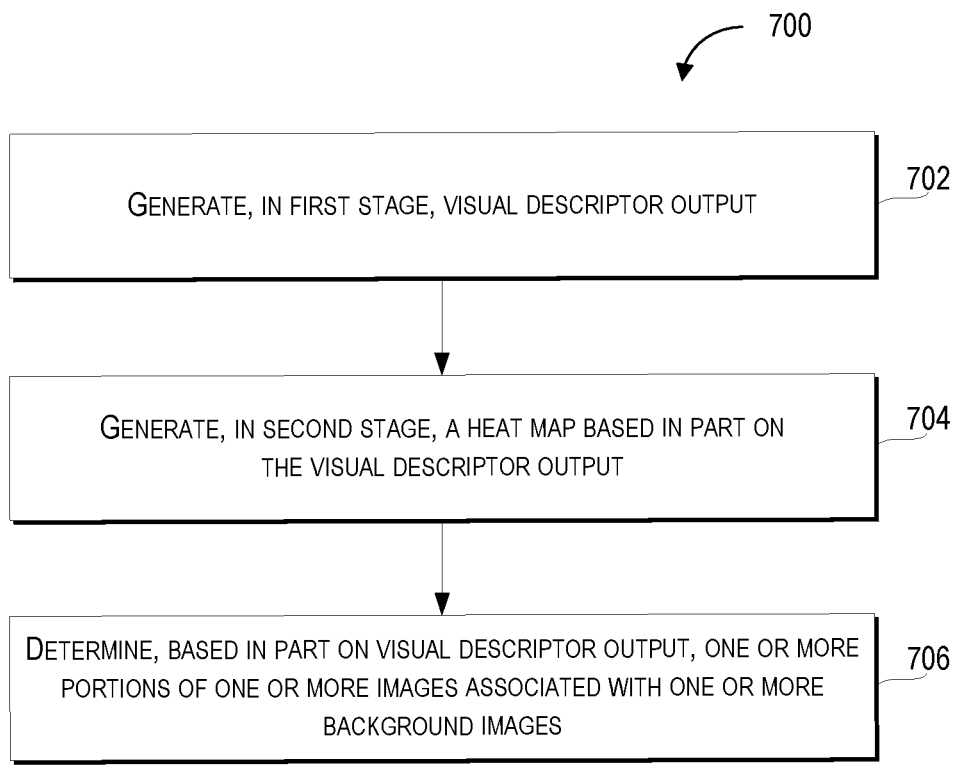
FIG. 7 depicts a second flow diagram of an example method of object detection and recognition according to example embodiments of the present disclosure.

FIG. 7 depicts a second flow diagram of an example method of object detection and recognition according to example embodiments of the present disclosure. One or more portions of the method 700, illustrated in FIG. 7, can be implemented by one or more devices (e.g., one or more computing devices) or systems including, for example, the vehicle 104, the vehicle computing system 108, or the operations computing system 150, shown in FIG. 1; or the multiple stage classifier system 200 shown in FIG. 2. Moreover, one or more portions of the method 700 can be implemented as an algorithm on the hardware components of the devices described herein (e.g., as in FIG. 1) to, for example, perform multiple-stage detection and/or recognition of objects including receiving object data, determining characteristics of one or more objects, and generating object output associated with detection of one or more objects. FIG. 7 depicts elements performed in a particular order for purposes of illustration and discussion. Those of ordinary skill in the art, using the disclosures provided herein, will understand that the elements of any of the methods discussed herein can be adapted, rearranged, expanded, omitted, combined, and/or modified in various ways without deviating from the scope of the present disclosure.

At 702, the method 700 can include generating, in the first stage of a multiple stage classification (e.g., the first stage of the multiple stage classification in the method 600) and based in part on the object data (e.g., the object data in the method 600), visual descriptor output associated with the one or more images (e.g., the one or more images in the method 600), the visual descriptor output can include color hue information, color saturation information, brightness information, and/or histogram of oriented gradients information. In some embodiments, the one or more first stage characteristics (e.g., the one or more first stage characteristics of the method 600) can be determined based in part on the visual descriptor output. For example, the first stage computing system 210 of the multiple stage classifier system 200 can generate, in the first stage of a multiple stage classification, and based in part on the object data, data including visual descriptor output associated with the one or more images (e.g., visual images). In some embodiments, the one or more first stage characteristics can be based in part on the visual descriptor output (e.g., the multiple stage classifier system 200 can use the visual descriptor output to determine the one or more first stage characteristics of the one or more portions of the sensor data). For example, the multiple stage classifier system 200 can use brightness information to determine the one or more first stage characteristics associated with the sky (e.g., the sky will tend to be brighter than the ground).

At 704, the method 700 can include generating, in the second stage of the multiple stage classification (e.g., the second stage of the multiple stage classification in the method 600) and based in part on the visual descriptor output from the first stage, a heat map associated with the one or more images (e.g., the one or more images in the method 600). The heat map can include a plurality of areas associated with a probability of at least one of the one or more objects being within the respective one of the plurality of areas. For example, the multiple stage classifier system 200 can generate a heat map indicating that the probability of a vehicle object being in the sky is a very low probability. Further, the multiple stage classifier system 200 can segment the one or images into a plurality of areas and, for each of the plurality of areas, determine a probability of an object being within that area. In some embodiments, the one or more second stage characteristics (e.g., the one or more second stage characteristics in the method 600) can be determined based in part on the heat map.

At 706, the method 700 can include determining, based in part on the visual descriptor output from the first stage, one or more portions of the one or more images that are associated with a background portion. In some embodiments, determining the one or more second stage characteristics in the second stage can include determining the one or more second stage characteristics in the second stage and excluding (e.g., not using) the one or more portions of the one or more images that are associated with the one or more background images (e.g., the one or more portions of the one or more images that are determined to not be of interest). Accordingly, the second stage of the multiple stage classification can perform object detection and recognition more rapidly by concentrating computational resources on a smaller subset of the object data (e.g., the foreground images of the one or more images) and avoiding the waste of resources that results from the analysis and/or processing of the one or more images that are part of the background.

Figure 8:
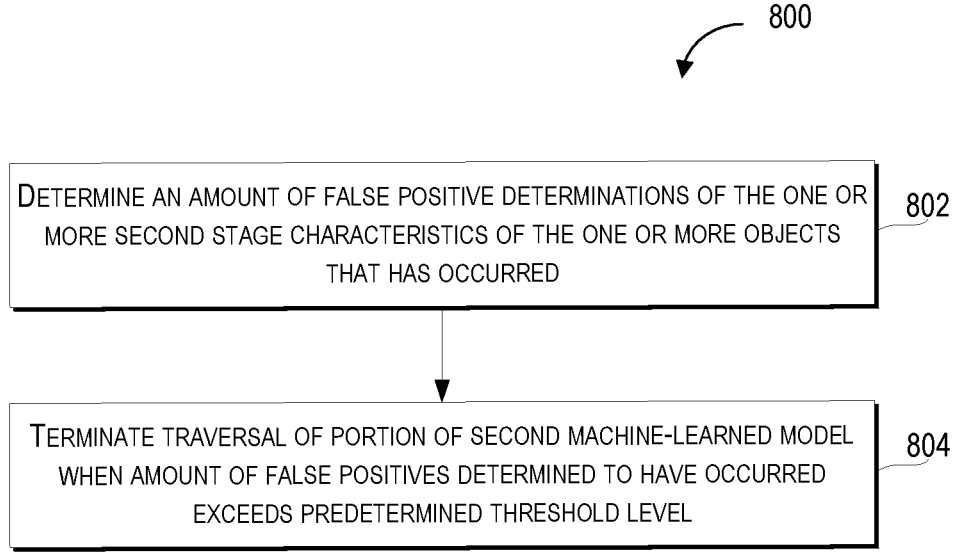
FIG. 8 depicts a third flow diagram of an example method of object detection and recognition according to example embodiments of the present disclosure.

FIG. 8 depicts a third flow diagram of an example method of object detection and recognition according to example embodiments of the present disclosure. One or more portions of the method 800, illustrated in FIG. 8, can be implemented by one or more devices (e.g., one or more computing devices) or systems including, for example, the vehicle 104, the vehicle computing system 108, or the operations computing system 150, shown in FIG. 1; or the multiple stage classifier system 200 shown in FIG. 2. Moreover, one or more portions of the method 800 can be implemented as an algorithm on the hardware components of the devices described herein (e.g., as in FIG. 1) to, for example, perform multiple-stage detection and/or recognition of objects including receiving object data, determining characteristics of one or more objects, and/or generating object output associated with detection of one or more objects. FIG. 8 depicts elements performed in a particular order for purposes of illustration and discussion. Those of ordinary skill in the art, using the disclosures provided herein, will understand that the elements of any of the methods discussed herein can be adapted, rearranged, expanded, omitted, combined, and/or modified in various ways without deviating from the scope of the present disclosure.

At 802, the method 800 can include determining, based in part on the object data (e.g., the object data in the method 600) and the second machine-learned model (e.g., the second machine-learned model in the method 600), an amount (e.g., a number of occurrences) of false positive determinations of the one or more second stage characteristics (e.g., the one or more second stage characteristics in the method 600) of the one or more objects (e.g., the one or more objects in the method 600) that has occurred. For example, the second stage computing system 230 can determine, based in part on the object data received from the first stage computing system 210, an amount of false positive determinations (e.g., the determination of the number of the one or more second stage characteristics that were detected but were not actually present) of the one or more second stage characteristics of the one or more objects that has occurred.

In some embodiments, the object detection system can determine, based in part on the object data and a second machine-learned model subsequent to the first machine-learned model, an amount of false positive determinations of the one or more second stage characteristics (when the second machine-learned model is used) of the one or more objects that has occurred. For example, a false positive determination of the one or more second stage characteristics can include a false determination that a portion of the object data that is foreground (e.g., a pedestrian laying down) is part of the background. The second stage of the multiple stage classification can subsequently correctly determine that the portion of the object data is actually foreground and not background. Accordingly, the number of times that false determinations occur can be determined (e.g., determined by the multiple stage classifier system 200).

At 804, the method 800 can include terminating the traversal of a portion of the second machine-learned model (e.g., terminating traversal of a second decision tree, including terminating traversal of the second plurality of nodes in the second classification model in the method 600) when the amount of the false positives determined to have occurred exceeds a predetermined threshold level. For example, the second stage computing system 230 can use the portion of the second machine-learned model (e.g., the second decision tree). Further, the multiple stage classifier system 200 can terminate traversal of a portion of the second machine-learned model (e.g., the second decision tree) by the second stage computing system 230 when the amount of false positive determinations by the second stage computing system 230 exceeds a predetermined amount (e.g., a number of false positive determinations and/or a proportion of false positive determinations of the one or more second stage characteristics with respect to the total number of the one or more second stage characteristics).

In some embodiments, at least one node of the second plurality of nodes in the second classification model is a terminal node of the first plurality of nodes (e.g., the first plurality of nodes in the method 600) in the first classification model (e.g., the first machine-learned model in the method 600); the second classification model can include an equal number of nodes as the first plurality of nodes; and/or the second classification model includes a greater number of nodes than the first plurality of nodes. For example, the first node in the second classification model can be the terminal node in the first classification model. As such, the second classification model can be a continuation of the first classification model and build upon the first classification model without starting classification analysis anew.

In some embodiments, the determination of the predetermined threshold level to terminate traversal of the machine-learned model can be based on performance (e.g., false positive rate) of the first machine-learned model or the second machine-learned model on a previously established data set (e.g., a training dataset in which all of the objects have been correctly identified) at the various depths of the portion of the second machine learned model (e.g., the decision tree). For example, the predetermined threshold level to terminate traversal of the portion of the second machine-learned model (e.g., decision tree) can be based in part on the depth of the portion of the first machine-learned model (e.g., the first decision tree) when the amount of false positives exceeds a predetermined percentage of detected objects (e.g., one percent of the detected objects) or a predetermined number of objects per image (e.g., four objects per image).

In some embodiments, the first stage of the multiple stage classification can be performed on a customized device (e.g., a customized FPGA) that operates in parallel and can rapidly determine one or more first stage characteristics of the one or more portions of sensor data including whether a portion of sensor data (e.g., a portion of an image) is foreground or a background. After determining one or more first stage characteristics, the second stage of the multiple stage classification can use a classification model with greater depth (i.e., has more nodes along the path from a root node to a terminal node) to determine one or more second stage characteristics that can, with a higher level of confidence, detect, recognize, and/or identify one or more objects including vehicles, pedestrians, streets, buildings, the sky, and/or cyclists.

Figure 9:
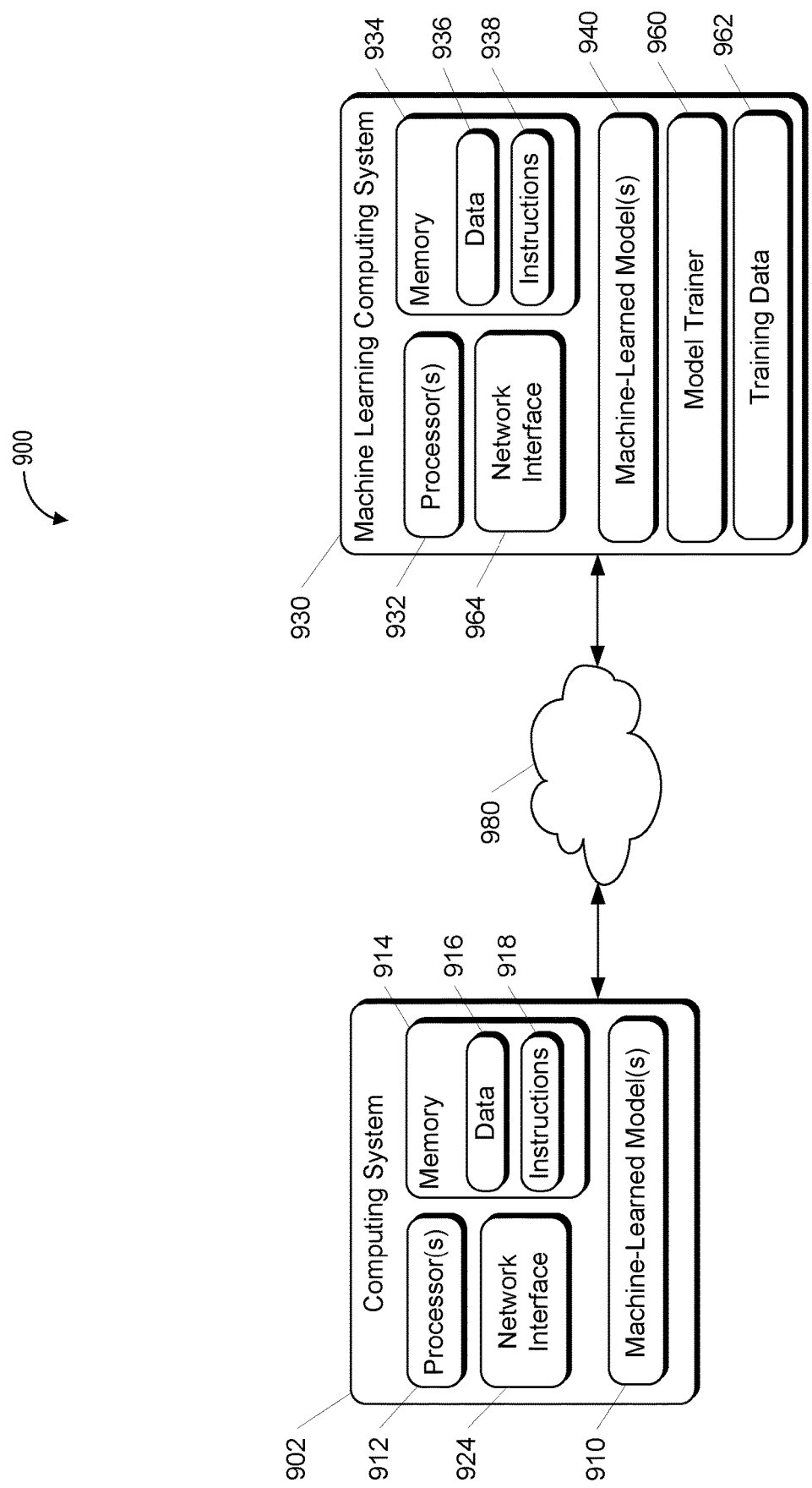
FIG. 9 depicts a second diagram of an example system according to example embodiments of the present disclosure.

FIG. 9 depicts a diagram of a second example system according to example embodiments of the present disclosure. As illustrated, an example system 900 includes a computing system 902 and a machine learning computing system 930 that are communicatively coupled (e.g., configured to send and/or receive signals and/or data) over one or more networks 980. Further, the example system 900 can perform one or more operations including receiving object data including portions of sensor data; determining, in a first stage of a multiple stage classification, first stage characteristics of the portions of sensor data based in part on a first machine-learned model; determining, in a second stage of the multiple stage classification, second stage characteristics of the portions of sensor data based in part on a second machine-learned model; and generating, an object output based in part on the first stage characteristics and the second stage characteristics, the object output including indications associated with detection of objects in the portions of sensor data.

In some implementations, the computing system 902 can perform various operations including multiple-stage detection and/or recognition of objects. In some implementations, the computing system 902 can be included in an autonomous vehicle. For example, the computing system 902 can be on-board the autonomous vehicle. In other implementations, the computing system 902 is not located on-board the autonomous vehicle. For example, the computing system 902 can operate offline to perform multiple-stage detection and/or recognition of objects. The computing system 902 can include one or more distinct physical computing devices.

The computing system 902 includes one or more processors 912 and a memory 914. The one or more processors 912 can be any suitable processing device (e.g., a processor core, a microprocessor, an ASIC, a FPGA, a controller, and/or a microcontroller) and can be one processor or a plurality of processors that are operatively connected. The memory 914 can include one or more non-transitory computer-readable storage media, including RAM, ROM, EEPROM, EPROM, one or more memory devices, and/or flash memory devices.

The memory 914 can store information that can be accessed by the one or more processors 912. For instance, the memory 914 (e.g., one or more non-transitory computer-readable storage mediums, and/or memory devices) can store data 916 that can be obtained, received, accessed, written, manipulated, created, and/or stored. The data 916 can include, for instance, include examples as described herein. In some implementations, the computing system 902 can obtain data from one or more memory devices that are remote from the computing system 902.

The memory 914 can also store computer-readable instructions 918 that can be executed by the one or more processors 912. The instructions 918 can be software written in any suitable programming language or can be implemented in hardware. Additionally, or alternatively, the instructions 918 can be executed in logically and/or virtually separate threads on the one or more processors 912.

For example, the memory 914 can store instructions 918 that when executed by the one or more processors 912 cause the one or more processors 912 to perform any of the operations and/or functions described herein, including, for example, performing multiple-stage detection and/or recognition of objects.

According to an aspect of the present disclosure, the computing system 902 can store or include one or more machine-learned models 910. As examples, the one or more machine-learned models 910 can include various machine-learned models including, for example, neural networks (e.g., deep neural networks), support vector machines, decision trees, ensemble models, k-nearest neighbors models, Bayesian networks, logistic regression classification, boosted forest classification, or other types of models including linear models and/or non-linear models. Example neural networks include feed-forward neural networks, recurrent neural networks (e.g., long short-term memory recurrent neural networks), or other forms of neural networks. The one or more machine-learned models 910 can include, for example, a first machine-learned model associated with first stage computing system 210 and/or a second machine-learned model associated with second stage computing system 230 within the multiple stage classifier system 200 of FIG. 2.

In some implementations, the computing system 902 can receive the one or more machine-learned models 910 from the machine learning computing system 930 over the one or more networks 980 and can store the one or more machine-learned models 910 in the memory 914. The computing system 902 can then use or otherwise implement the one or more machine-learned models 910 (e.g., by the one or more processors 912). In particular, the computing system 902 can implement the one or more machine-learned models 910 to perform multiple-stage detection and/or recognition of objects.

The machine learning computing system 930 includes one or more processors 932 and a memory 934. The one or more processors 932 can be any suitable processing device (e.g., a processor core, a microprocessor, an ASIC, a FPGA, a controller, and/or a microcontroller) and can be one processor or a plurality of processors that are operatively connected. The memory 934 can include one or more non-transitory computer-readable storage media, including RAM, ROM, EEPROM, EPROM, one or more memory devices, and/or flash memory devices.

The memory 934 can store information that can be accessed by the one or more processors 932. For instance, the memory 934 (e.g., one or more non-transitory computer-readable storage mediums, memory devices) can store data 936 that can be obtained, received, accessed, written, manipulated, created, and/or stored. The data 936 can, for instance, include examples as described herein. In some implementations, the machine learning computing system 930 can obtain data from one or more memory devices that are remote from the machine learning computing system 930.

The memory 934 can also store computer-readable instructions 938 that can be executed by the one or more processors 932. The instructions 938 can be software written in any suitable programming language or can be implemented in hardware. Additionally, or alternatively, the instructions 938 can be executed in logically and/or virtually separate threads on the one or more processors 932.

For example, the memory 934 can store instructions 938 that when executed by the one or more processors 932 cause the one or more processors 932 to perform any of the operations and/or functions described herein, including, for example, performing multiple-stage detection and/or recognition of objects.

In some implementations, the machine learning computing system 930 includes one or more server computing devices. If the machine learning computing system 930 includes multiple server computing devices, such server computing devices can operate according to various computing architectures, including, for example, sequential computing architectures, parallel computing architectures, or some combination thereof.

In addition or alternatively to the one or more machine-learned models 910 at the computing system 902, the machine learning computing system 930 can include one or more machine-learned models 940. As examples, the one or more machine-learned models 940 can include various machine-learned models including, for example, neural networks (e.g., deep neural networks), support vector machines, decision trees, ensemble models, k-nearest neighbors models, Bayesian networks, logistic regression classification, boosted forest classification, or other types of models including linear models and/or non-linear models. Example neural networks include feed-forward neural networks, recurrent neural networks (e.g., long short-term memory recurrent neural networks, or other forms of neural networks).

As an example, the machine learning computing system 930 can communicate with the computing system 902 according to a client-server relationship. For example, the machine learning computing system 930 can implement the one or more machine-learned models 940 to provide a web service to the computing system 902. For example, the web service can provide results including the type, identity, and/or class of objects that have been detected and/or recognized.

Thus, one or more machine-learned models 910 can be located and used at the computing system 902 and/or the one or more machine-learned models 940 can be located and used at the machine learning computing system 930.

In some implementations, the machine learning computing system 930 and/or the computing system 902 can train the one or more machine-learned models 910 and/or the one or more machine-learned models 940 through use of a model trainer 960. The model trainer 960 can train the one or more machine-learned models 910 and/or the one or more machine-learned models 940 using one or more training or learning algorithms. One example training technique is backwards propagation of errors. In some implementations, the model trainer 960 can perform supervised training techniques using a set of labeled training data. In other implementations, the model trainer 960 can perform unsupervised training techniques using a set of unlabeled training data. The model trainer 960 can perform a number of generalization techniques to improve the generalization capability of the models being trained. Generalization techniques include weight decays, dropouts, or other techniques.

In particular, the model trainer 960 can train one or more machine-learned models 910 and/or one or more machine-learned models 940 based on a set of training data 962. The training data 962 can include, for example, various features of one or more objects. The model trainer 960 can be implemented in hardware, firmware, and/or software controlling one or more processors.

The computing system 902 can also include a network interface 924 used to communicate with one or more systems or devices, including systems or devices that are remotely located from the computing system 902. The network interface 924 can include any circuits, components, software, for communicating with one or more networks (e.g., the one or more networks 980). In some implementations, the network interface 924 can include, for example, one or more of a communications controller, receiver, transceiver, transmitter, port, conductors, software and/or hardware for communicating data. Further, the machine learning computing system 930 can include a network interface 964.

The one or more networks 980 can include any type of network or combination of networks that allows for communication between devices. In some embodiments, the one or more networks 980 can include one or more of a local area network, wide area network, the Internet, secure network, cellular network, mesh network, peer-to-peer communication link and/or some combination thereof and can include any number of wired or wireless links. Communication over the one or more networks 980 can be accomplished, for instance, via a network interface using any type of protocol, protection scheme, encoding, format, and/or packaging.

FIG. 9 illustrates one example computing system 900 that can be used to implement the present disclosure. Other computing systems can be used as well. For example, in some implementations, the computing system 902 can include the model trainer 960 and the training data 962. In such implementations, the one or more machine-learned models 910 can be both trained and used locally at the computing system 902. As another example, in some implementations, the computing system 902 is not connected to other computing systems.

In addition, components illustrated and/or discussed as being included in one of the computing systems 902 or 930 can instead be included in another of the computing systems 902 or 930. Such configurations can be implemented without deviating from the scope of the present disclosure. The use of computer-based systems allows for a great variety of possible configurations, combinations, and divisions of tasks and functionality between and among components. Computer-implemented operations can be performed on a single component or across multiple components. Computer-implemented tasks and/or operations can be performed sequentially or in parallel. Data and instructions can be stored in a single memory device or across multiple memory devices.

While the present subject matter has been described in detail with respect to specific example embodiments and methods thereof, it will be appreciated that those skilled in the art, upon attaining an understanding of the foregoing can readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A computer-implemented method of autonomous vehicle operation, the computer-implemented method comprising:
receiving sensor data comprising image;
determining in a first stage of a multiple stage classification using one or more hardware components, one or more first stage characteristics of the sensor data based in part on a first machine-learned model, wherein the first stage characteristics are determined by the first machine-learned model with a first level of confidence;

excluding a portion of the sensor data corresponding to one or more areas within the image from an input to a second stage of the multiple stage classification based on the one or more first stage characteristics of the sensor data;

determining in the second stage of the multiple stage classification and based on the input to the second stage, one or more second stage characteristics of the sensor data based in part on a second machine-learned model, wherein the second stage characteristics are determined by the second machine-learned model with a second level of confidence that is higher than the first level of confidence; and generating an object output based on the second stage characteristics, wherein the object output describes detection of one or more objects in the sensor data.

2. The computer-implemented method of claim 1, wherein the one or more first stage characteristics of the sensor data determined in the first stage of the multiple stage classification describes a likelihood that the portion of the sensor data that is excluded from the input to the second stage of the multiple stage classification contains objects.

3. The computer-implemented method of claim 1, further comprising generating in the first stage, a heat map associated with the sensor data, the heat map describing a probability of an object being contained within a respective area of a plurality of areas of the sensor data.

4. The computer-implemented method of claim 3, wherein excluding the portion of the sensor data from the input to the second stage of the multiple stage classification based on the one or more first stage characteristics of the sensor data comprises excluding the portion of the sensor data based on the heat map.

5. The computer-implemented method of claim 3, wherein excluding the portion of the sensor data from the input to the second stage of the multiple stage classification based on the one or more first stage characteristics of the sensor data comprises excluding the portion of the sensor data based on the visual descriptor output associated with the sensor data.

6. The computer-implemented method of claim 1, wherein the portion of the sensor data that is excluded from the input to the second stage of the multiple stage classification is associated with one or more background portions of the sensor data.

7. The computer-implemented method of claim 1, wherein the input to the second stage of the multiple stage classification is associated with one or more foreground portions of the sensor data.

8. The computer-implemented method of claim 1, further comprising:

generating in the first stage and based in part on the sensor data, visual descriptor output associated with the sensor data, the visual descriptor output comprising color hue information, color saturation information, brightness information, or histogram of oriented gradients information, wherein the one or more first stage characteristics are determined based in part on the visual descriptor output.

9. A computing system comprising:
one or more processors; and
a memory comprising one or more computer-readable media, the memory storing computer-readable instructions that when executed by the one or more processors cause the one or more processors to perform operations comprising:

receiving sensor data comprising an image;

determining, in a first stage of a multiple stage classification using one or more hardware components, one or more first stage characteristics of the sensor data based in part on a first machine-learned model, wherein the first stage characteristics are determined by the first machine-learned model with a first level of confidence;

excluding a portion of the sensor data corresponding to one or more areas within the image from an input to a second stage of the multiple stage classification based on the one or more first stage characteristics of the sensor data, determining in the second stage of the multiple stage classification and based on the input to the second stage, one or more second stage characteristics of the sensor data based in part on a second machine-learned model, wherein the second stage characteristics are determined by the second machine-learned model with a second level of confidence that is higher than the first level of confidence; and generating an object output based on the second stage characteristics, wherein the object output describes detection of one or more objects in the sensor data.

10. The computing system of claim 9, wherein the one or more first stage characteristics of the sensor data determined in the first stage of the multiple stage classification describes a likelihood that the portion of the sensor data that is excluded from the input to the second stage of the multiple stage classification contains objects.

11. The computing system of claim 9, wherein the operations further comprise generating, in the first stage, a heat map associated with the sensor data, the heat map describing a probability of an object being contained within a respective area of a plurality of areas of the sensor data.

12. The computing system of claim 9, wherein the portion of the sensor data that is excluded from the input to the second stage of the multiple stage classification is associated with one or more background portions of the sensor data.

13. The computing system of claim 9, wherein the input to the second stage of the multiple stage classification is associated with one or more foreground portions of the sensor data.

14. The computing system of claim 9, wherein the operations further comprise generating, in the first stage and based in part on the sensor data, visual descriptor output associated with the sensor data, the visual descriptor output comprising color hue information, color saturation information, brightness information, or histogram of oriented gradients information, wherein the one or more first stage characteristics are determined based in part on the visual descriptor output.

15. The computing system of claim 14, wherein excluding the portion of the sensor data from the input to the second stage of the multiple stage classification based on the one or more first stage characteristics of the sensor data comprises excluding the portion of the sensor data based on the visual descriptor output associated with the sensor data.

16. One or more tangible, non-transitory computer-readable media storing computer-readable instructions that when executed by one or more processors cause the one or more processors to perform operations, the operations comprising:

receiving, by a computing system comprising one or more computing devices, sensor data comprising image;

determining, by the computing system, in a first stage of a multiple stage classification using one or more hardware components, one or more first stage characteristics of the sensor data based in part on a first machine-learned model, wherein the first stage characteristics are determined by the first machine-learned model with a first level of confidence;

excluding, by the computing system, a portion of the sensor data corresponding to one or more areas within the image from an input to a second stage of the multiple stage classification based on the one or more first stage characteristics of the sensor data;

determining, by the computing system, in the second stage of the multiple stage classification and based on the input to the second stage, one or more second stage characteristics of the sensor data based in part on a second machine-learned model, wherein the second stage characteristics are determined by the second machine-learned model with a second level of confidence that is higher than the first level of confidence; and generating, by the computing system, an object output based on the second stage characteristics, wherein the object output describes detection of one or more objects in the sensor data.

17. One or more tangible, non-transitory computer-readable media of claim 16, wherein the one or more first stage characteristics of the sensor data determined in the first stage of the multiple stage classifications describes a likelihood that the portion of the sensor data that is excluded from the input to the second stage of the multiple stage classification contains objects.

18. The one or more tangible, non-transitory computer-readable media of claim 16, wherein the operations further comprise generating, by the computing system, in the first stage, a heat map associated with the sensor data, the heat map describing a probability of an object being contained within a respective area of a plurality of areas of the sensor data.

19. The one or more tangible, non-transitory computer-readable media of claim 18, wherein excluding the portion of the sensor data from the input to the second stage of the multiple stage classification based on the one or more first stage characteristics of the sensor data comprises excluding the portion of the sensor data based on the heat map.

* * * * *